US007712024B2

(12) United States Patent  (10) Patent No.: US 7,712,024 B2
Reynar et al.  (45) Date of Patent: May 4, 2010

(54) APPLICATION PROGRAM INTERFACES FOR SEMANTICALLY LABELING STRINGS AND PROVIDING ACTIONS BASED ON SEMANTICALLY LABELED STRINGS

(75) Inventors: Jeff Reynar, Woodinville, WA (US); Ziyi Wang, Redmond, WA (US); Roger Wolff, Redmond, WA (US); Tuan Huynh, Seattle, WA (US); Nobuya Higashiyama, Issaquah, WA (US); Michael Ammerlaan, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 463 days.

(21) Appl. No.: 09/906,467

(22) Filed: Jul. 16, 2001

(65) Prior Publication Data

US 2002/0035581 A1  Mar. 21, 2002

Related U.S. Application Data

(63) Continuation-in-part of application No. 09/588,411, filed on Jun. 6, 2000.

(51) Int. Cl.
*G06F 17/00* (2006.01)
*G06F 17/20* (2006.01)

(52) U.S. Cl. ..................... 715/230; 707/101

(58) Field of Classification Search .............. 707/6, 707/513, 531, 515, 101; 345/356, 346, 334, 345/335, 354; 364/419; 395/773; 715/512, 715/230

See application file for complete search history.

(56) References Cited

U.S. PATENT DOCUMENTS 4,674,065 A  6/1987  Lange et al. ............... 364/900

(Continued)

FOREIGN PATENT DOCUMENTS

CA  2 246 920 A1  3/2000

(Continued)

OTHER PUBLICATIONS

Hannes Marais, Supporting cooperative and personal surfing with a desktop assistant, 1997, ACM Press, pp. 129-138.*

(Continued)

*Primary Examiner*—Laurie Ries
*Assistant Examiner*—James J Debrow
(74) *Attorney, Agent, or Firm*—Merchant & Gould

(57) ABSTRACT

Application program interfaces (API) are provided for labeling strings while a user is creating a document and providing user actions based on the type of semantic label applied to the string. A recognizer API is provided and includes properties and methods or instructions which allow recognizer plug-ins to semantically label strings of text or cells or information. An action API is provided and includes properties and methods that are called upon when a user initiates particular actions such as opening a web browser, going to a particular URL, or opening an instance of a word processing or spreadsheet program. After the strings are annotated with a type label, application program modules may use the type label to provide users with a choice of actions. If the user's computer does not have any actions associated with a type label, the user may be provided with the option to surf to a download Uniform Resource Locator (URL) and download action plug-ins for that type label. One or more recognizer plug-ins perform the recognition of particular strings in an electronic document. The recognizer plug-ins may be packaged with an application program module or they may be written by third parties to recognize particular strings that are of interest. One or more action plug-ins provide possible actions to be presented to the user based upon the type label associated with the string.

19 Claims, 5 Drawing Sheets

U.S. PATENT DOCUMENTS

| | | | | |
|---|---|---|---|---|
| 4,868,750 A | 9/1989 | Kucera et al. | | 711/2 |
| 5,020,019 A | 5/1991 | Ogawa | | 364/900 |
| 5,128,865 A | 7/1992 | Sadler | | 704/2 |
| 5,159,552 A | 10/1992 | van Gasteren et al. | | 704/1 |
| 5,267,155 A | 11/1993 | Buchanan et al. | | 364/419.14 |
| 5,287,448 A | 2/1994 | Nicol et al. | | 715/707 |
| 5,297,039 A | 3/1994 | Kanaegami et al. | | 707/5 |
| 5,317,546 A | 5/1994 | Balch et al. | | 368/9 |
| 5,337,233 A | 8/1994 | Hofert et al. | | 715/540 |
| 5,341,293 A | 8/1994 | Vertelney et al. | | 715/530 |
| 5,351,190 A | 9/1994 | Kondo | | 704/8 |
| 5,386,564 A | 1/1995 | Shearer et al. | | 395/650 |
| 5,392,386 A | 2/1995 | Chalas | | 395/155 |
| 5,418,902 A | 5/1995 | West et al. | | 715/503 |
| 5,446,891 A | 8/1995 | Kaplan et al. | | 395/600 |
| 5,522,089 A | 5/1996 | Kikinis et al. | | 710/73 |
| 5,535,323 A | 7/1996 | Miller et al. | | 715/707 |
| 5,541,836 A | 7/1996 | Church et al. | | 704/7 |
| 5,546,521 A | 8/1996 | Martinez | | 715/711 |
| 5,581,684 A | 12/1996 | Dudzik et al. | | 715/708 |
| 5,596,700 A * | 1/1997 | Darnell et al. | | 715/512 |
| 5,617,565 A | 4/1997 | Augenbraun et al. | | 395/604 |
| 5,625,783 A | 4/1997 | Ezekiel et al. | | 395/352 |
| 5,627,567 A | 5/1997 | Davidson | | 345/173 |
| 5,627,958 A | 5/1997 | Potts et al. | | 715/708 |
| 5,634,019 A | 5/1997 | Koppolu et al. | | 715/744 |
| 5,640,560 A | 6/1997 | Smith | | 395/615 |
| 5,657,259 A | 8/1997 | Davis et al. | | 708/204 |
| 5,685,000 A | 11/1997 | Cox | | 704/9 |
| 5,708,825 A | 1/1998 | Sotomayor | | 395/762 |
| 5,715,415 A | 2/1998 | Dazey et al. | | 715/708 |
| 5,717,923 A | 2/1998 | Dedrick | | 395/613 |
| 5,752,022 A | 5/1998 | Chiu et al. | | 395/610 |
| 5,761,589 A | 6/1998 | Rayson et al. | | 707/533 |
| 5,764,794 A | 6/1998 | Perlin | | 382/186 |
| 5,765,156 A | 6/1998 | Guzak et al. | | 707/100 |
| 5,781,189 A | 7/1998 | Holleran et al. | | 715/826 |
| 5,781,904 A | 7/1998 | Oren et al. | | 707/100 |
| 5,794,257 A | 8/1998 | Liu et al. | | 707/501 |
| 5,799,068 A | 8/1998 | Kikinis et al. | | 379/93.06 |
| 5,802,253 A | 9/1998 | Gross et al. | | 395/51 |
| 5,802,262 A | 9/1998 | Van De Vanter | | 395/180 |
| 5,802,299 A | 9/1998 | Logan et al. | | 395/200.48 |
| 5,802,530 A | 9/1998 | van Hoff | | 707/513 |
| 5,805,911 A | 9/1998 | Miller | | 395/796 |
| 5,809,318 A * | 9/1998 | Rivette et al. | | 715/512 |
| 5,815,830 A | 9/1998 | Anthony | | 707/6 |
| 5,818,447 A | 10/1998 | Wolf et al. | | 715/752 |
| 5,821,931 A * | 10/1998 | Berquist et al. | | 715/784 |
| 5,822,539 A | 10/1998 | van Hoff | | 395/200.66 |
| 5,822,720 A | 10/1998 | Bookman et al. | | 704/3 |
| 5,822,530 A | 10/1998 | Gramlich | | 395/200.47 |
| 5,832,100 A | 11/1998 | Lawton et al. | | 382/100 |
| 5,845,077 A | 12/1998 | Fawcett | | 709/221 |
| 5,855,007 A | 12/1998 | Jovicic et al. | | 705/14 |
| 5,859,636 A * | 1/1999 | Pandit | | 715/501.1 |
| 5,872,973 A | 2/1999 | Mitchell et al. | | 395/685 |
| 5,875,443 A | 2/1999 | Nielsen | | 707/2 |
| 5,877,757 A | 3/1999 | Baldwin et al. | | 715/705 |
| 5,884,266 A | 3/1999 | Dvorak | | 704/270.1 |
| 5,892,919 A | 4/1999 | Nielsen | | 395/200.58 |
| 5,893,073 A | 4/1999 | Kasso et al. | | 705/8 |
| 5,893,132 A | 4/1999 | Huffman et al. | | 715/201 |
| 5,895,461 A | 4/1999 | De La Huerga et al. | | 707/1 |
| 5,896,321 A | 4/1999 | Miller et al. | | 365/189.01 |
| 5,900,004 A | 5/1999 | Gipson | | 707/530 |
| 5,907,832 A | 5/1999 | Yamada | | 715/541 |
| 5,913,214 A | 6/1999 | Madnick et al. | | 707/10 |
| 5,920,859 A | 7/1999 | Li | | 707/5 |
| 5,924,099 A | 7/1999 | Guzak et al. | | 707/100 |
| 5,933,139 A | 8/1999 | Feigner et al. | | 715/708 |
| 5,933,140 A | 8/1999 | Strahorn et al. | | 715/712 |
| 5,933,498 A | 8/1999 | Schneck et al. | | 705/54 |
| 5,940,614 A | 8/1999 | Allen et al. | | 717/120 |
| 5,944,787 A | 8/1999 | Zoken | | 709/206 |
| 5,946,647 A | 8/1999 | Miller et al. | | 704/9 |
| 5,948,061 A | 9/1999 | Merriman et al. | | 702/219 |
| 5,956,681 A | 9/1999 | Yamakita | | 704/260 |
| 5,974,413 A * | 10/1999 | Beauregard et al. | | 707/6 |
| 5,987,480 A | 11/1999 | Donohue et al. | | 715/501.1 |
| 5,991,719 A | 11/1999 | Yazaki et al. | | 704/251 |
| 5,995,756 A | 11/1999 | Hermann | | 395/712 |
| 6,006,265 A | 12/1999 | Rangan et al. | | 709/226 |
| 6,006,279 A | 12/1999 | Hayes | | 719/328 |
| 6,014,616 A | 1/2000 | Kim | | 704/8 |
| 6,018,761 A | 1/2000 | Uomini | | 706/206 |
| 6,028,605 A * | 2/2000 | Conrad et al. | | 715/840 |
| 6,029,135 A | 2/2000 | Krasle | | 704/275 |
| 6,029,171 A | 2/2000 | Smiga et al. | | 707/102 |
| 6,031,525 A | 2/2000 | Perlin | | 345/173 |
| 6,052,531 A | 4/2000 | Waldin et al. | | 717/170 |
| 6,061,516 A | 5/2000 | Yoshikawa et al. | | 717/109 |
| 6,067,087 A | 5/2000 | Krauss et al. | | 715/762 |
| 6,072,475 A | 6/2000 | Van Ketwich | | 345/173 |
| 6,073,090 A | 6/2000 | Fortune et al. | | 704/8 |
| 6,085,201 A | 7/2000 | Tso | | 707/505 |
| 6,088,711 A | 7/2000 | Fein et al. | | 715/523 |
| 6,092,074 A | 7/2000 | Rodkin et al. | | 707/102 |
| 6,108,640 A | 8/2000 | Slotznick | | 705/26 |
| 6,108,674 A | 8/2000 | Murakami et al. | | 707/515 |
| 6,112,209 A | 8/2000 | Gusack | | 707/101 |
| 6,121,968 A | 9/2000 | Arcuri et al. | | 345/352 |
| 6,122,647 A * | 9/2000 | Horowitz et al. | | 715/513 |
| 6,126,306 A | 10/2000 | Ando | | 708/605 |
| 6,137,911 A | 10/2000 | Zhilyaev | | 382/225 |
| 6,141,005 A | 10/2000 | Hetherington et al. | | 715/866 |
| 6,151,643 A | 11/2000 | Cheng et al. | | 710/36 |
| 6,154,738 A | 11/2000 | Call | | 707/4 |
| 6,167,469 A | 12/2000 | Safai et al. | | 710/62 |
| 6,167,523 A | 12/2000 | Strong | | 726/21 |
| 6,167,568 A | 12/2000 | Gandel et al. | | 717/176 |
| 6,173,316 B1 | 1/2001 | De Boor et al. | | 709/218 |
| 6,182,029 B1 | 1/2001 | Friedman | | 704/9 |
| 6,185,550 B1 | 2/2001 | Snow et al. | | 707/1 |
| 6,185,576 B1 | 2/2001 | McIntosh | | 707/200 |
| 6,199,046 B1 | 3/2001 | Heinzle et al. | | 705/1 |
| 6,199,081 B1 | 3/2001 | Meyerzon et al. | | 715/513 |
| 6,208,338 B1 | 3/2001 | Fischer et al. | | 715/705 |
| 6,219,698 B1 | 4/2001 | Iannucci et al. | | 709/221 |
| 6,246,404 B1 | 6/2001 | Feigner et al. | | 715/708 |
| 6,262,728 B1 * | 7/2001 | Alexander | | 345/440.1 |
| 6,272,074 B1 | 8/2001 | Winner | | 368/10 |
| 6,272,505 B1 | 8/2001 | De La Huerga | | 707/501 |
| 6,282,489 B1 | 8/2001 | Bellesfield et al. | | 701/201 |
| 6,291,785 B1 | 9/2001 | Koga et al. | | 209/584 |
| 6,292,768 B1 | 9/2001 | Chan | | 704/1 |
| 6,295,061 B1 | 9/2001 | Park et al. | | 715/764 |
| 6,297,822 B1 | 10/2001 | Feldman | | 715/705 |
| 6,300,950 B1 | 10/2001 | Clark et al. | | 715/705 |
| 6,308,171 B1 | 10/2001 | De La Huerga | | 707/3 |
| 6,311,152 B1 | 10/2001 | Bai et al. | | 704/9 |
| 6,311,177 B1 | 10/2001 | Dauerer et al. | | 707/2 |
| 6,311,194 B1 | 10/2001 | Sheth et al. | | 707/505 |
| 6,320,496 B1 | 11/2001 | Sokoler et al. | | 340/470.1 |
| 6,323,853 B1 | 11/2001 | Hedloy | | 345/339 |
| 6,336,125 B2 | 1/2002 | Noda et al. | | 715/531 |
| 6,336,131 B1 | 1/2002 | Wolfe et al. | | 709/203 |
| 6,338,059 B1 | 1/2002 | Fields et al. | | 707/4 |
| 6,339,436 B1 | 1/2002 | Amro et al. | | 715/714 |
| 6,339,755 B1 | 1/2002 | Hetherington et al. | | 704/8 |
| 6,347,398 B1 | 2/2002 | Parthasarathy et al. | | 717/170 |
| 6,349,295 B1 | 2/2002 | Tedesco et al. | | 707/3 |
| 6,353,926 B1 | 3/2002 | Parthesarathy et al. | | 717/11 |
| 6,381,742 B2 | 4/2002 | Forbes et al. | | 717/176 |

| Patent No. | Date | Inventor | Class |
|---|---|---|---|
| 6,382,350 B1 | 5/2002 | Jezewski et al. | 181/290 |
| 6,392,668 B1 | 5/2002 | Murray | 715/38 |
| 6,396,515 B1 | 5/2002 | Hetherington et al. | 715/762 |
| 6,401,067 B2 | 6/2002 | Lewis et al. | 704/275 |
| 6,408,323 B1 | 6/2002 | Kobayashi et al. | 709/100 |
| 6,413,100 B1 | 7/2002 | Dickmeyer et al. | 434/322 |
| 6,415,304 B1 | 7/2002 | Horvitz | 715/205 |
| 6,421,678 B2 | 7/2002 | Smiga et al. | 707/102 |
| 6,424,979 B1 | 7/2002 | Livingston et al. | 715/511 |
| 6,434,567 B1 | 8/2002 | De La Huerga | 707/102 |
| 6,438,545 B1 | 8/2002 | Beauregard et al. | 707/6 |
| 6,441,753 B1 | 8/2002 | Montgomery | 341/34 |
| 6,442,545 B1 | 8/2002 | Feldman et al. | 707/8 |
| 6,442,591 B1 | 8/2002 | Haynes et al. | 709/206 |
| 6,456,304 B1 | 9/2002 | Anguilo et al. | 715/779 |
| 6,470,091 B2 | 10/2002 | Koga et al. | 382/101 |
| 6,473,069 B1 | 10/2002 | Gerpheide | 345/157 |
| 6,477,510 B1 | 11/2002 | Johnson | 705/30 |
| 6,480,860 B1 | 11/2002 | Monday | 707/102 |
| 6,493,006 B1 | 12/2002 | Gourdol et al. | 345/825 |
| 6,498,982 B2 | 12/2002 | Bellesfield et al. | 701/202 |
| 6,510,504 B2 | 1/2003 | Satyanarayanan | 711/170 |
| 6,516,321 B1 | 2/2003 | De La Huerga | 707/102 |
| 6,519,557 B1 | 2/2003 | Emens et al. | 704/8 |
| 6,519,603 B1 * | 2/2003 | Bays et al. | 707/102 |
| 6,546,433 B1 | 4/2003 | Matheson | 709/318 |
| 6,553,385 B2 | 4/2003 | Johnson et al. | 707/104.1 |
| 6,556,972 B1 | 4/2003 | Bakis et al. | 704/277 |
| 6,556,984 B1 | 4/2003 | Zien | 707/2 |
| 6,564,264 B1 | 5/2003 | Creswell et al. | 709/246 |
| 6,571,241 B1 | 5/2003 | Nosohara | 707/6 |
| 6,571,253 B1 | 5/2003 | Thompson et al. | 707/103 R |
| 6,591,260 B1 | 7/2003 | Schwarzhoff et al. | 707/2 |
| 6,595,342 B1 | 7/2003 | Maritzen et al. | 194/212 |
| 6,601,075 B1 | 7/2003 | Huang et al. | 707/104.1 |
| 6,604,099 B1 | 8/2003 | Chung et al. | 707/3 |
| 6,615,131 B1 | 9/2003 | Rennard et al. | 701/200 |
| 6,618,733 B1 | 9/2003 | White et al. | 707/103 |
| 6,622,140 B1 | 9/2003 | Kantrowitz | 707/5 |
| 6,623,527 B1 | 9/2003 | Hamzy | 715/513 |
| 6,625,581 B1 | 9/2003 | Perkowski | 705/27 |
| 6,629,079 B1 | 9/2003 | Spiegel et al. | 705/26 |
| 6,631,519 B1 | 10/2003 | Nicholson et al. | 717/169 |
| 6,636,880 B1 | 10/2003 | Bera | 708/206 |
| 6,643,650 B1 * | 11/2003 | Slaughter et al. | 707/10 |
| 6,654,734 B1 | 11/2003 | Mani et al. | 707/2 |
| 6,654,932 B1 | 11/2003 | Bahrs et al. | 715/507 |
| 6,658,623 B1 | 12/2003 | Schilit et al. | 715/513 |
| 6,687,485 B2 | 2/2004 | Hopkins et al. | 434/350 |
| 6,694,307 B2 | 2/2004 | Julien | 707/3 |
| 6,697,824 B1 | 2/2004 | Bowman-Amuah | 707/102 |
| 6,697,837 B1 | 2/2004 | Rodov | 709/203 |
| 6,708,189 B1 | 3/2004 | Fitzsimons et al. | 707/205 |
| 6,715,144 B2 | 3/2004 | Daynes et al. | 717/174 |
| 6,717,593 B1 | 4/2004 | Jennings | 715/760 |
| 6,718,516 B1 | 4/2004 | Claussen et al. | 715/513 |
| 6,728,679 B1 | 4/2004 | Strubbe et al. | 704/270.1 |
| 6,732,090 B2 | 5/2004 | Shanahan et al. | 707/3 |
| 6,732,361 B1 | 5/2004 | Andreoli et al. | 719/313 |
| 6,741,994 B1 | 5/2004 | Kang et al. | 707/102 |
| 6,742,054 B1 | 5/2004 | Upton, IV | 710/6 |
| 6,745,208 B2 | 6/2004 | Berg et al. | 707/201 |
| 6,766,326 B1 | 7/2004 | Cena | 707/101 |
| 6,795,808 B1 | 9/2004 | Strubbe et al. | 704/275 |
| 6,802,061 B1 | 10/2004 | Parthasarathy et al. | 717/173 |
| 6,826,726 B2 | 11/2004 | Hsing et al. | 715/513 |
| 6,829,631 B1 | 12/2004 | Forman et al. | 709/202 |
| 6,845,499 B2 | 1/2005 | Srivastava et al. | 717/100 |
| 6,857,103 B1 | 2/2005 | Wason | 715/709 |
| 6,859,908 B1 | 2/2005 | Clapper | 715/224 |
| 6,868,625 B2 | 3/2005 | Szabo | 715/738 |
| 6,874,125 B1 | 3/2005 | Carroll et al. | 715/705 |
| 6,874,143 B1 | 3/2005 | Murray et al. | 717/173 |
| 6,880,129 B1 | 4/2005 | Lee et al. | 715/763 |
| 6,883,137 B1 | 4/2005 | Girardot et al. | 715/513 |
| 6,898,604 B1 | 5/2005 | Ballinger et al. | 707/101 |
| 6,901,402 B1 | 5/2005 | Corston-Oliver et al. | 701/101 |
| 6,904,560 B1 | 6/2005 | Panda | 715/202 |
| 6,925,457 B2 | 8/2005 | Britton et al. | 707/1 |
| 6,925,470 B1 | 8/2005 | Sangudi et al. | 707/102 |
| 6,944,857 B1 | 9/2005 | Glaser et al. | 717/173 |
| 6,948,133 B2 | 9/2005 | Haley | 715/780 |
| 6,950,831 B2 | 9/2005 | Haley | 707/104.1 |
| 6,950,982 B1 * | 9/2005 | Dourish | 715/234 |
| 6,957,385 B2 | 10/2005 | Chan et al. | 715/504 |
| 6,963,867 B2 | 11/2005 | Ford et al. | 707/3 |
| 6,964,010 B1 | 11/2005 | Sharp | 715/507 |
| 6,975,983 B1 | 12/2005 | Fortescue et al. | 704/9 |
| 6,976,090 B2 | 12/2005 | Ben-Shaul et al. | 709/246 |
| 6,976,209 B1 | 12/2005 | Storisteanu et al. | 715/512 |
| 6,981,212 B1 | 12/2005 | Claussen et al. | 715/205 |
| 6,986,104 B2 | 1/2006 | Green et al. | 715/523 |
| 6,990,654 B2 | 1/2006 | Carroll, Jr. | 717/109 |
| 7,003,522 B1 | 2/2006 | Reynar et al. | 707/10 |
| 7,013,289 B2 | 3/2006 | Horn et al. | 705/26 |
| 7,024,658 B1 | 4/2006 | Cohen et al. | 717/117 |
| 7,028,312 B1 | 4/2006 | Merrick et al. | 719/330 |
| 7,032,174 B2 | 4/2006 | Montero et al. | 715/257 |
| 7,039,859 B1 | 5/2006 | Sundaresan | 715/229 |
| 7,051,076 B2 | 5/2006 | Tsuchiya | 709/206 |
| 7,082,392 B1 | 7/2006 | Butler et al. | 704/233 |
| 7,100,115 B1 | 8/2006 | Yennaco | 715/748 |
| 7,113,976 B2 | 9/2006 | Watanabe | 709/206 |
| 7,146,564 B2 | 12/2006 | Kim et al. | 715/235 |
| 7,216,351 B1 | 5/2007 | Maes | 719/328 |
| 7,237,190 B2 | 6/2007 | Rollins et al. | 715/234 |
| 7,281,245 B2 | 10/2007 | Reynar et al. | 717/173 |
| 7,302,634 B2 * | 11/2007 | Lucovsky et al. | 715/200 |
| 7,305,354 B2 | 12/2007 | Rodriguez et al. | 705/26 |
| 7,392,479 B2 | 6/2008 | Jones et al. | 715/513 |
| 7,421,645 B2 | 9/2008 | Reynar | 715/206 |
| 7,454,459 B1 | 11/2008 | Kapoor et al. | 709/203 |
| 2001/0029605 A1 | 10/2001 | Forbes et al. | 717/11 |
| 2001/0041328 A1 | 11/2001 | Fisher | 434/157 |
| 2001/0042098 A1 | 11/2001 | Gupta et al. | 709/206 |
| 2001/0049702 A1 | 12/2001 | Najmi | 707/513 |
| 2001/0056461 A1 | 12/2001 | Kampe et al. | 709/201 |
| 2002/0002590 A1 | 1/2002 | King et al. | 709/206 |
| 2002/0003469 A1 | 1/2002 | Gupta | 340/407.1 |
| 2002/0003898 A1 | 1/2002 | Wu | 382/187 |
| 2002/0004803 A1 | 1/2002 | Serebrennikov | 715/513 |
| 2002/0007309 A1 | 1/2002 | Reynar | 705/14 |
| 2002/0023113 A1 | 2/2002 | Hsing et al. | 707/513 |
| 2002/0023136 A1 | 2/2002 | Silver et al. | 709/206 |
| 2002/0026450 A1 | 2/2002 | Kuramochi | 707/104.1 |
| 2002/0029304 A1 | 3/2002 | Reynar et al. | 709/332 |
| 2002/0038180 A1 | 3/2002 | Bellesfield et al. | 701/202 |
| 2002/0065110 A1 | 5/2002 | Enns et al. | 455/566 |
| 2002/0065891 A1 | 5/2002 | Malik | 709/206 |
| 2002/0066073 A1 | 5/2002 | Lienhard et al. | 717/105 |
| 2002/0078222 A1 | 6/2002 | Compas et al. | 709/232 |
| 2002/0091803 A1 | 7/2002 | Imamura et al. | 709/220 |
| 2002/0099687 A1 | 7/2002 | Krishnaprasad et al. | 707/1 |
| 2002/0100036 A1 | 7/2002 | Moshir et al. | 717/173 |
| 2002/0103829 A1 | 8/2002 | Manning et al. | 707/513 |
| 2002/0104080 A1 | 8/2002 | Woodard et al. | 717/176 |
| 2002/0110225 A1 | 8/2002 | Cullis | 379/67.1 |
| 2002/0111928 A1 | 8/2002 | Haddad | 707/1 |
| 2002/0120685 A1 | 8/2002 | Srivastava et al. | 709/203 |
| 2002/0129107 A1 | 9/2002 | Loughran et al. | 709/206 |
| 2002/0133523 A1 | 9/2002 | Ambler et al. | 707/536 |
| 2002/0149601 A1 | 10/2002 | Rajarajan et al. | 345/619 |
| 2002/0156774 A1 | 10/2002 | Beauregard et al. | 707/3 |
| 2002/0156792 A1 | 10/2002 | Gombocz et al. | 707/100 |
| 2002/0169802 A1 | 11/2002 | Brewer et al. | 707/513 |
| 2002/0175955 A1 * | 11/2002 | Gourdol et al. | 345/821 |

| | | | | |
|---|---|---|---|---|
| 2002/0178008 A1 | 11/2002 | Reynar ............... 704/272 | EP | 1361523 A2 | 11/2003 |
| 2002/0178182 A1 | 11/2002 | Wang et al. ........... 715/501.1 | EP | 1376392 A2 | 1/2004 |
| 2002/0184247 A1 | 12/2002 | Jokela et al. ............ 707/204 | EP | 1 447 754 A1 | 8/2004 |
| 2002/0188941 A1 | 12/2002 | Cicciarelli et al. ....... 717/175 | EP | 1 452 966 A33 | 9/2004 |
| 2002/0196281 A1 | 12/2002 | Audleman et al. ........ 345/762 | JP | 64-88771 | 4/1989 |
| 2002/0198909 A1 | 12/2002 | Huynh et al. ............ 707/513 | JP | 05-174013 | 7/1993 |
| 2003/0002391 A1 | 1/2003 | Biggs ................. 368/82 | JP | 08-272662 | 10/1996 |
| 2003/0005411 A1 | 1/2003 | Gerken ................ 717/120 | JP | 09-138636 | 5/1997 |
| 2003/0009489 A1 | 1/2003 | Griffin ................ 707/500 | JP | 10-171827 | 6/1998 |
| 2003/0014745 A1 | 1/2003 | Mah et al. ............. 717/170 | JP | 2000-222394 | 8/2000 |
| 2003/0025728 A1 | 2/2003 | Ebbo et al. ............. 345/744 | JP | 2000-231566 | 8/2000 |
| 2003/0046316 A1 | 3/2003 | Gergic et al. ............ 707/513 | JP | 2001-014303 | 1/2001 |
| 2003/0050911 A1 | 3/2003 | Lucovsky et al. .......... 707/1 | JP | 2001-125994 | 5/2001 |
| 2003/0051236 A1 | 3/2003 | Pace et al. ............. 717/177 | JP | 2001-522112 | 11/2001 |
| 2003/0056207 A1 | 3/2003 | Fischer et al. ........... 717/174 | JP | 2001-0350464 | 12/2001 |
| 2003/0081791 A1 | 5/2003 | Erickson et al. .......... 380/282 | JP | 2002-041353 | 2/2002 |
| 2003/0083910 A1 | 5/2003 | Sayal et al. ............. 705/7 | JP | 2002163250 A | 6/2002 |
| 2003/0084138 A1 | 5/2003 | Tavis et al. ............. 709/223 | JP | 2002-222181 | 8/2002 |
| 2003/0097318 A1 | 5/2003 | Yu et al. ............... 705/35 | JP | 2003-141174 | 5/2003 |
| 2003/0101190 A1 | 5/2003 | Horvitz et al. ........... 707/100 | WO | WO 95/07510 A1 | 3/1995 |
| 2003/0101204 A1 | 5/2003 | Watson ................ 708/206 | WO | WO 99/17240 A1 | 4/1999 |
| 2003/0101416 A1 | 5/2003 | McInnes et al. .......... 715/513 | WO | WO 00/54174 A1 | 9/2000 |
| 2003/0106040 A1 | 6/2003 | Rubin et al. ............ 717/100 | WO | WO 00/67117 | 11/2000 |
| 2003/0115039 A1 | 6/2003 | Wang ................. 704/4 | WO | WO 00/73949 A1 | 12/2000 |
| 2003/0121033 A1 | 6/2003 | Peev et al. ............. 717/175 | WO | WO 01/18687 | 3/2001 |
| 2003/0126136 A1 | 7/2003 | Omoigui ............... 707/10 | WO | WO 01/37170 A2 | 5/2001 |
| 2003/0140308 A1 | 7/2003 | Murthy et al. ........... 715/500 | WO | WO 01/86390 A2 | 11/2001 |
| 2003/0154144 A1 | 8/2003 | Pokorny et al. ........... 705/28 | WO | WO 02/099627 A1 | 1/2002 |
| 2003/0158841 A1 | 8/2003 | Britton et al. ........... 707/3 | WO | WO 02/15518 A2 | 2/2002 |
| 2003/0158851 A1 | 8/2003 | Britton et al. ........... 707/100 | WO | WO 02/42928 A1 | 5/2002 |
| 2003/0167445 A1 | 9/2003 | Su et al. ............... 715/513 | WO | WO 2004/012099 A2 | 2/2004 |
| 2003/0172343 A1 | 9/2003 | Leymaster et al. ........ 715/500 | | | |
| 2003/0177341 A1 | 9/2003 | Devillers ............... 712/227 | | | |
| 2003/0182391 A1 | 9/2003 | Leber et al. ............. 709/217 | | OTHER PUBLICATIONS | |
| 2003/0192040 A1 | 10/2003 | Vaughan ............... 717/173 | | | |
| 2003/0195937 A1 | 10/2003 | Kircher et al. ........... 709/207 | | | |
| 2003/0212527 A1 | 11/2003 | Moore et al. ............ 702/179 | | | |
| 2003/0220795 A1 | 11/2003 | Arayasantiparb et al. ... 704/275 | | | |
| 2003/0229593 A1 | 12/2003 | Raley et al. ............. 705/55 | | | |
| 2003/0233330 A1 | 12/2003 | Raley et al. ............. 705/55 | | | |
| 2004/0002939 A1 | 1/2004 | Arora et al. ............. 707/1 | | | |
| 2004/0003389 A1 | 1/2004 | Reynar et al. ............ 717/178 | | | |
| 2004/0006564 A1 | 1/2004 | Lucovsky et al. ......... 707/10 | | | |
| 2004/0006741 A1 | 1/2004 | Radja et al. ............. 715/513 | | | |
| 2004/0003990 A1 | 2/2004 | Bakar ................. 715/505 | | | |
| 2004/0024875 A1* | 2/2004 | Horvitz et al. ........... 709/226 | | | |
| 2004/0044959 A1 | 3/2004 | Shanmugasundaram et al. ............... 715/513 | | | |
| 2004/0068694 A1 | 4/2004 | Kaler et al. ............. 715/513 | | | |
| 2004/0083218 A1 | 4/2004 | Feng .................. 707/100 | | | |
| 2004/0133846 A1 | 7/2004 | Khoshatefeh et al. ...... 715/500 | | | |
| 2004/0143581 A1 | 7/2004 | Bohannon et al. ......... 707/100 | | | |
| 2004/0165007 A1 | 8/2004 | Shafron ................ 345/781 | | | |
| 2004/0199861 A1 | 10/2004 | Lucovsky ............. 715/500 | | | |
| 2004/0201867 A1 | 10/2004 | Katano ................ 358/1.15 | | | |
| 2004/0236717 A1 | 11/2004 | Demartini et al. ......... 707/1 | | | |
| 2005/0050164 A1 | 3/2005 | Burd et al. ............. 709/217 | | | |
| 2005/0055330 A1 | 3/2005 | Britton et al. ........... 707/1 | | | |
| 2005/0094850 A1 | 5/2005 | Nakao ................. 382/193 | | | |
| 2005/0108195 A1 | 5/2005 | Yalovsky et al. .......... 707/1 | | | |
| 2005/0120313 A1 | 6/2005 | Rudd et al. ............. 715/866 | | | |
| 2005/0187926 A1 | 8/2005 | Britton et al. ........... 707/3 | | | |
| 2006/0173674 A1 | 8/2006 | Nakajima et al. .......... 704/9 | | | |

FOREIGN PATENT DOCUMENTS

| | | |
|---|---|---|
| EP | 0 364 180 A2 | 4/1990 |
| EP | 0481784 A2 | 4/1992 |
| EP | 0598511 A2 | 5/1994 |
| EP | 0872827 A2 | 10/1998 |
| EP | 0810520 B1 | 12/1998 |
| EP | 1093058 A1 | 4/2001 |
| EP | 1280068 A2 | 1/2003 |

OTHER PUBLICATIONS

Blaheta et al., "Assigning Function Tags to Parsed Text", Morgan Kaufmann Publishers Inc, 2000, pp. 234-240.*

Lewis et al., "A Sequential Algorithm for Training Text Classifiers", Spring-Verlag New York, Inc, 1994; pp. 1-10.*

Ghamrawi et al., "Collective Multi-Label Classification", ACM, 2005, pp. 195-200.*

Glover et al., "Inferring hierarchical Descriptions", ACM, 2002, pp. 507-514.*

Ghamrawi et al., "Collective Multi-Label Classification", ACM, 2005, pp. 195-200.*

Technique for Automatically Correcting Words in Text; Karen Kukich;*ACM Comput. Surv.*, 24, 4 (Dec. 1992); pp. 377-439.

Putting People First: Specifying Proper Names in Speech Interfaces, Matt Marx and Chris Schmandt; *Proceedings of the ACM Symposium on User Interface Software and Technology*; 1994; pp. 29-37.

Interface and execution models in the fluke kernel; Bryan Ford, Mike Hibler, Jay Lepreau, Roland McGrath and Patrick Tullman; *Proceedings of the third symposium on operating systems design and implementation*, (1999) p. 101-115.

Exploring the applications user-expertise assessment for intelligent interfaces; Michel C. Desmarais and Jiming Liu; *Proceedings of the conference on human factors in computing systems*, (1993) p. 308-313.

Future directions in user-computer interface software; James D. Foley; *Conference proceedings on organizational computer systems*, (1991) p. 289-297.

Human-computer interface development: concepts and systems for its management, H. Rex Hartson and Deborah Hix; *ACM Comput. Surv.* 1 (Mar. 1989) p. 5-92.

Integrating computer technology, people technology; strategies and case studies from Georgia Tech's Graphics, Visualization and Usability Center, Jim Foley; *Proceedings of the workshop on advanced visual interfaces*, (1994) p. 34-43.

Command management system for next-generation user input; M. Tsai, P. Reiher and G.J. Popek; *Proceedings of the seventh workshop on hottopics in operating systems*, (1999) p. 17984.

U.S. Appl. No. 09/818,157, filed Mar. 27, 2001, entitled "Automatically Adding Proper Names to a Database."

U.S. Appl. No. 09/841,265, filed Apr. 24, 2001, entitled "Method and System for Applying Input Mode Bias."
U.S. Appl. No. 09/841,266, filed Apr. 24, 2001, entitled "Method and System for Providing Electronic Commerce Actions Based on Semantically Labeled Strings."
U.S. Appl. No. 09/906,552, filed Jul. 16, 2001, entitled "Method and System for Providing Restricted Actions for Recognized Semantic Categories."
U.S. Appl. No. 09/907,418, filed Jul. 17, 2001, entitled "Method and System for Defining Semantic Categories and Actions."
U.S. Appl. No. 09/588,411, filed Jun. 6, 2000, entitled "Method and System for Semantically Labeling Strings and Providing Actions Based on Semantically Labeled Strings."
U.S. Appl. No. 10/141,712, filed May 9, 2002, entitled "Method, System, and Apparatus for Converting Dates Between Calendars and Languages Based Upon Semantically Labeled Strings."
U.S. Appl. No. 10/154,630, filed May 23, 2002, entitled "Method, System, and Apparatus for Converting Numbers Based Upon Semantically Labeled Strings."
U.S. Appl. No. 10/140,544, filed May 7, 2002, entitled "Method, System, and Apparatus for Converting Numbers Between Measurement Systems Based Upon Semantically Labeled Strings."
U.S. Appl. No. 10/155,680, filed May 23, 2002, entitled "Method, System, and Apparatus for Converting Currency Values Based Upon Semantically Labeled Strings."
U.S. Appl. No. 10/179,810, filed Jun. 25, 2002, entitled "Method, System, and Apparatus for Performing Custom Actions on Digital Content."
U.S. Appl. No. 10/178,680, filed Jun. 24, 2002, entitled "System and Method for Incorporating Smart Tags in Online Content."
U.S. Appl. No. 10/179,438, filed Jun. 25, 2002, entitled "Method and System for Dynamically Providing Actions Associated with Semantically Labeled Strings."
U.S. Appl. No. 10/184,298, filed Jun. 27, 2002, entitled "Method and System for Associating Actions with Semantic Labels in Electronic Documents."
Willisson, Pace, et al., "UNIX Man Pages: ispell," http://www.comp.lancs.ac.uk/computing/users/eiamjw/unix/chap8.html, http://www.physics.umn.edu/cgi-bin/man-cgi?spell, http://www.vorlesungen.uni-osnabrueck.de/informatik/shellscript/Html/Man/_Man_NeXT_html/html, http://duplex.hypermart.net/books.bsd/501-504.html, pp. 1-20.
Kuenning, Geoff, "International Ispell," Version 3.1.00, Oct. 8, 1993, http:// www.rt.com/man/findaffix.1.html, http://www.csee.usf.edu/cgi-bin/man-cgi?ispell, http://fmg-www.cs.ucla.edu/geoff/ispell.html, pp. 1-33.
Kuenning, Geoff, "Ispell, v. 3.1," http://theochem.ki.ku.dk/on_line_docs/ispell/ispell_1.html, pp. 1-6.
"UNIX Man Pages: sed," http://www.calpoly.edu/cgi-bin/man-cgi?spell+1, pp. 1-14.
McMahon, Lee. E., "SED—A Non-Interactive Text Editor," Bell Laboratories, Murray Hill, New Jersey 07974, pp. 1-15.
Beitner, N.D.; Hall, W.; Goble, C.A., "Multimedia Support and Authoring in Microcosm: An Extended Model," Dept. of Electronics and Computer Science, Univ. of Southampton, Southampton SO17 1BJ, UK; Dept. of Computer Science, Univ. of Manchester, Oxford Road, Manchester MI3 9PL, UK, pp. 1-12.
IBM Corporation, IBM Research Disclosure #368; "Multimedia Hyperlinks Automatically Created For Reference Documents," *IBM Technical Disclosure* Bulletin, Jun. 1993, pp. 1-5.
*The Complete LINUX™ Operating System 5.2 Deluxe*, Red Hat, Macmillian Digital Publishing USA, A Viacom Company, Red Hat Software, Inc., ISBN 1-57595-199-1B, pp. 1-385.
*User Manual For AddressMate and AddressMate Plus*, CoStar Corporation, AddressMate Software, 1994-1995, pp. 1-210.
Getting Results With Microsoft® Office 97, *Real World Solutions For The Work You Do*, Microsoft Corporation, pp. 1-703.
*InfoCentral™ 7*, User's Manual, Corel Corporation, vol. 1, Version 7.0, 1996, pp. 1-86.
Corel® Office Professional 7 Quick Results User's Manual, vol. 1, Version 7.0 (first printing), Corel Corporation, Limited, pp. 1-531.
Novell GroupWise User's Guide for Windows 16-Bit Version 5.2, Novell, Inc., 1993-1997, pp. 1-231.
Novell GroupWise User's Guide for Windows 32-Bit Version 5.2, Novell, Inc., 1998, pp. 1-318.
Claris Em@iler Getting Started User's Guide, For Macintosh, Claris Corporation, 1995-1997.
Developer's Guide To Apple Data Detectors, For Version 1.0.2., Apple Computer, Inc., 1997, pp. 1-33.
Apple Data Detectors User's Manual, Apple Computer, Inc., 1997, pp. 1-15.
Nardi, Bonnie A.; Miller, James R.; Wright, David J., "Collaborative, Programmable Intelligent Agents," Jim Miller/Miramontes Computing, Apple Computer Advanced Technology Group, Mar. 1998, pp. 1-11.
Devanbue, P. et al., "Chime: customizable hyperlink insertion and maintenance engine for software engineering environments", Software Engineering, Publication date: 1999, ISBN: 1-58113-07400.
"Using Flyswat", http://www.flywsat.com/using.html, download date: Sep. 28, 1999, 1 pp.
"What is Flyswat", http://www.flyswat.com, download date: Sep. 28, 1999, 5 pp.
"Intelligent Text Processing: About", http://www.syntalex.co.uk/about/about.html, download date: Aug. 7, 1999, 1 pp.
"Intelligent Text Processing: Automatic Cross-Referencing", http://www.syntalex.co.uk/services/acrl.html, download date Aug. 7, 1999, 3 pp.
"Intelligent Text Processing: Case Study: Context", http://www.syntalex.co.uk/casestudies/context.html, download date: Aug. 7, 1999, 3 pp.
U.S. Official Action dated May 26, 2006 in U.S. Appl. No. 09/588,411.
U.S. Official Action dated May 31, 2006 in U.S. Appl. No. 10/141,712.
U.S. Official Action dated Jun. 1, 2006 in U.S. Appl. No. 10/366,141.
Harold, E.R., "XML: Extensible Markup Language", IDG Books Worldwide, Books 24x7.com printout, 1998, 20 pp.
U.S. Appl. No. 11/396,937, filed Apr. 3, 2006, entitled "Automatically Adding Proper Names to a Database".
U.S. Official Action dated Feb. 24, 2006 in U.S. Appl. No. 10/154,630.
U.S. Official Action dated Apr. 5, 2006 in U.S. Appl. No. 10/377,258.
U.S. Official Action dated Apr. 10, 2006 in U.S. Appl. No. 10/179,810.
U.S. Official Action dated Apr. 17, 2006 in U.S. Appl. No. 10/179,438.
U.S. Final Official Action dated Apr. 17, 2006 in U.S. Appl. No. 10/184,190.
Hewkin, "Smart Tags-the Distributed-Memory Resolution", IEE Review, Jun. 22, 1989, pp. 203-206.
Measuring Units Conversion Table—http://web.archie.org—1997 Internet French Property, pp. 1-4.
IBM Technical Disclosure Bulletin, "National Language Support Enhancement for Culture-Specific Operations", Nov. 1, 1993, vol. 36, Issue 11, pp. 629-638.
Towers, J. Tarin, Visual Quickstart Guide: Dreamweaver 2 for Windows and Macintosh, 1999, Peachpit Press, pp. 150-151.
Driza, Scott, "Learn Word 2000 VBA Document Automation", Wordware Publishing Inc., 2001, 6 pp.
Menu Customizing, IBM Technical Disclosure Bulletin, vol. 34, No. 1, Jun. 1991, pp. 91-92 (4 pp. total).
Perry, Brad, et al., "Discovering Similar Resources by Content Park-Linking", Proceedings of the Sixth International Conference on Information and Knowledge Management, published by ACM Press 1997, pp. 317-324.
Schulz, Charles, "Writing Applications for Uniform Operation on a Mainframe or PC: A Metric Conversion Program", Lockheed Missles & Space Company, Inc., Sunnyvale, CA, May 1990, pp. 348-361.
"Integrating with External Systems: iPlanet™ Unified Development Server", Sun Microsystems, Inc., Ver. 5.0, Aug. 2001, pp. 127-156.
Sperberg-McQueen, C.M. and Thompson, Henry, "XML Schema", W3C Architecture Domain, http://web.archive.org/web/20020802155904/http://www.w3.org/XML/Schema, 2000-2002, pp. 1-10.

Quin, Liam, "Extensible Markup Language (XML)", W3C Architecture Domain, http://web.archive.org/web/2002121962057/http://www.w3.org/XML/, 1996-2002, pp. 1-3.

Clark, James, and DeRose, Steve, "XML Path Language (XPath), Version 1.0", W3C, http://web.archive.org/web/2021010034434/http://www.w3.org/TR/xpath, 1999-2000, pp. 1-31.

"Microsoft BizTalk Server 2002—Using BizTalk Mapper", http://msdn.Microsoft.com/library/en-us/bts_2002/htm/lat_xmltools_map_intro_zkqb.asp . . . , Microsoft Corporation, 1999-2001, pp. 1-2.

"BizTalk Server 2002 Mapper User Interface", http://msdn.microsoft.com/library/en-us/bts_2002/htm/lat_xmltools_map_concept_codw . . . , Microsoft Corporation, 1999-2001, pp. 1.

"BizTalk Server 2002 Compiling Maps", http://msdn.microsoft.com/library/en-us/bts_2002/htm/lat_xmltools_map_concept_drgl.a . . . , Microsoft Corporation, 1999-2001, pp. 1.

"BizTalk Server 2002 Testing Maps", http://msdn.microsoft.com/library/en-us/bts_2002/htm/lat_xmltools_map_concept_fhhy.a . . . , Microsoft Corporation, 1999-2001, pp. 1-2.

"BizTalk Server 2002 View Links and Functoids By Using Grid Preview", http://msdn.microsoft.com/library/en-us/bts_2002/htm/lat_xmltools_map_check_fuwn.as . . . , Microsoft Corporation, 1999-2001, pp. 1.

"The StarOffice™ 6.0 Suite: New Features Guide", Sun Microsystems, V. 1.1, Jul. 2002, pp. 1-31.

"New Microsoft Office Family Application Taps Power of Industry-Standard XML", http://www.microsoft.com/presspass/press/2002/oct02/10-09officefamilypr.mspx, Microsoft Corporation, Oct. 2002-Feb. 2003, pp. 1-2.

"Q&A: How 'XDocs' Alters the Paradigm for Gathering Business-Critical Information", http://www.microsoft.com/presspass/press/2002/oct02/10-09officefamily.mspx, Microsoft Corporation, Oct. 2002-Feb. 2003, pp. 1-4.

"InfoPath: Microsoft Names New Product from Office Group", http://www.microsoft.com/presspass/press/2003/feb03/02-10infopath.mspx, Microsoft Corporation, Oct. 2002-Feb. 2003, pp. 1-4.

"Microsoft Unveils Visual Studio.NET Enterprise Tools", Microsoft Corporation, http://www.microsoft.com/presspass/press/2001/may01/05-21vseepr.mspx, May 2001, pp. 1-4.

"Microsoft Extends XML Web Services Support in .NET Enterprise Servers Through Visual Studio .NET", http://www.microsoft.com/presspass/press/2002/feb02/02-13servervspr.mspx, Microsoft Corporation, Feb. 2002, pp. 1-3.

"How to Use XSL to Transform Excel XML Spreadsheet for Server-Side Use", http://support.microsoft.com/defalut.aspx?scid=kb;en-us;278976, Microsoft Corporation, Aug. 2004, pp. 1-7.

Mueller, Jennifer M., "Work Smarter with Smart Tags", Journal of Accounting—Online, vol. 194, No. 5, Nov. 2002, http://www.aicpa.org/pubs/jofa/nov2002/Mueller.htm>, retrieved on Apr. 22, 2005.

M. Fernandez et al., "SilkRoute: trading between relations and XML", Computer Networks, vol. 33, No. 1-6, Jun. 2000, pp. 723-745.

V. Braganholo, "Updating Relational Databases Through XML Views", Technical Report, Sep. 2002, pp. 1-61.

G. Falquet et al., "Design and Analysis of Active Hypertext Views on Databases", Information Sciences Institute, Jan. 2002, pp. 1-24.

S. Ceri et al., "Deriving Production Rules for Incremental View Maintenance", Proceedings of the 17th International Conference on Very Large Data Bases, Sep. 1991, pp. 577-589.

A. Bonifati, "Active Behaviors within XML Document Management", EDBT Ph. D. Workshop, Mar. 2000, pp. 1-4.

"Integrated Development Environment (IDE)", http://web.archive.org/web/20020602032242/http:altova.com/products_ide.html, Jun. 2002, pp. 1-2.

"Altova markup your mind!" http://web.archive.org/web/20021204211721/http://altova.com/products_ide.html, Dec. 2002, pp. 1-3.

Arbortext, "Arbortext and Accessibility", http://web.archive.org/web/20021219133536/www.arbortext.com/html/accessibility.html, Dec. 2002, pp. 1-5.

Arbortext, "XML Compliance, 100% Pure XML", http:web.archive.org/web/20021209185855/www.arbortext.com/html/xml_compliance, Dec. 2002, pp. 1-3.

Arbortext, "Schemas", http://web.archive.org/web/20021221023148/www.arbortext.com/html/schemas.html, Dec. 2002, pp. 1-3.

Arbortext, "Arbortext's Support for XSL-FO", http://web.archive.org/web/20021221021632/www.arbortext.com/html/xsl-fo.html. Dec. 2002, pp. 1-4.

Corel, "Corel XMetal4, Making XML Content Creation Easy", http://web.archive.org/web/20031118215158/www.corel.com/servlet/Satellite?pagename, Nov. 2003, pp. 1-2.

Corel, "Corel XMetal 4 and Interwoven TeamXML", http://web.archive.org/web/20030807211225/www.corel.com/futuretense_cs/ccurl/corel+xml+4+and+interwoven+teamxml.pdf, Aug. 2003, pp. 1-2.

Corel, "The Corel-XyEnterprise XML Solution", http://web.archive.org/web/20030807154355/www.corel.com/futuretense_cs/ccurl/corel+and+XY+enterprise+XML+solution.pdf, Aug. 2003, pp. 1-2.

Brooks-Bilson, "Programming ColdFusion" [electronic resource] 2001, Safari Tech Books Online, 1st Edition, 25 pp.

Wilker, John, "ColdFusion MX Adds J2EE, XML, and Web Services Compatibility", Aug. 9, 2002, http://builder.com.com/5102-6387-104585.html, 3 pp.

Homer, Alex et al., Professional Active Services Pages, 1997, Wrox Press Ltd., Section"Client-Side Scripting and Components", subsection "Choosing Your Applets, and Controls", 16 pp.

Flanagan, D., "JavaScript—The Definitive Guide, Fourth Edition", Jan. 2002, O'Reilly, 12 pp.

Brockschmidt, K., "Inside OLE, Second Edition", 1995, Microsoft Press, p. 169.

Toth, V., "Visual C++ 4 Unleashed", 1996, Sams Publishing, p. 174.

Sriram, V., "ComponentXchange: An E-Exchange for Software Components", Master Thesis, CitSeer, May 2001, pp. i-v, 1-77.

Bosak, "XML: The Universal Publishing Format", SGML/XML Europe '98, May 1998, pp. A1-C17.

Kristensen, "Template Resolution in XML/HTML", Computer Networks and ISDN Systems, vol. 30, 1998, pp. 239-249.

Fan et al., "FormPlus: A Form Authoring Toolkit", Proceedings of the Fourteenth Annual Computer Software and Applications Conference, Oct. 31, 1990-Nov. 2, 1990, pp. 255-260.

Boone, "Concept Features in Re: Agent, An Intelligent Email Agent", Proceedings of the 2nd International Conference on Autonomous Agents, May 9-13, 1998, pp. 141-148.

Takkinen et al., "CAFÉ: A Conceptual Model for Managing Information in Electronic Mail", Proceedings of the Annual Hawaii International Conference on System Sciences, 1998, pp. 44-53.

"Smart Tags: Dumb Technology?", webreference.com, Online, Aug. 29, 2001, http://www.webreference.com/xml/column30/3.html, 3 pp.

"Being 'Smart' with Smart Tags in Office XP", Create for Mississippi, Aug. 2001, http://www.create.cett.msstate.edu/create/howto/smart_tags.pdf, 7 pp.

U.S. Appl. No. 10/164,960, filed Jun. 6, 2002, entitled "Providing Contextually Sensitive Actions and Help Content in Computer-Generated Documents".

U.S. Appl. No. 10/164,260, filed Jun. 5, 2002, entitled "Mechanism for Downloading Software Components from a Remote Source for Use by a Local Software Application".

U.S. Appl. No. 10/731,899, filed Dec. 9, 2003, entitled "Mechanism for Downloading Components Associated with XML Documents and Smart Documents".

U.S. Appl. No. 10/366,141, filed Feb. 13, 2003, entitled "Linking Elements of a Document to Corresponding Fields, Queries and/or Procedures in a Database".

U.S. Appl. No. 10/377,258, filed Feb. 28, 2003, entitled "Method and System for Enhancing Paste Functionality of a Computer Software Application".

U.S. Appl. No. 10/608,267, filed Jun. 27, 2003, entitled "Leveraging Markup Language Data for Semantically Labeling Text Strings and Data and for Providing Actions Based on Semantically Labeled Text Strings and Data".

U.S. Appl. No. 10/780,376, filed Feb. 17, 2004, entitled "Methods and Systems for Providing Automatic Actions on Recognized Text Strings in a Computer-Generated Document".
U.S. Appl. No. 10/184,190, filed Jun. 27, 2002, entitled "System and Method for Providing Namespace Related Information".
U.S. Appl. No. 10/183,317, filed Jun. 25, 2002, entitled "System and Method for Issuing a Message to a Program".
U.S. Official Action dated Dec. 29, 2003 in U.S. Appl. No. 09/588,411.
U.S. Official Action dated Feb. 12, 2004 in U.S. Appl. No. 10/154,630.
U.S. Official Action dated Mar. 29, 2004 in U.S. Appl. No. 09/906,552.
U.S. Official Action dated Jun. 14, 2004 in U.S. Appl. No. 09/588,411.
U.S. Official Action dated Jun. 18, 2004 in U.S. Appl. No. 09/818,157.
U.S. Official Action dated Aug. 20, 2004 in U.S. Appl. No. 09/841,266.
U.S. Official Action dated Sep. 29, 2004 in U.S. Appl. No. 09/907,418.
U.S. Official Action dated Oct. 6, 2004 in U.S. Appl. No. 09/818,157.
U.S. Official Action dated Nov. 2, 2004 in U.S. Appl. No. 10/178,680.
U.S. Official Action dated Dec. 8, 2004 in U.S. Appl. No. 09/588,411.
U.S. Official Action dated Jan. 25, 2005 in U.S. Appl. No. 09/906,552.
U.S. Official Action dated Jan. 26, 2005 in U.S. Appl. No. 10/154,630.
U.S. Official Action dated Mar. 1, 2005 in U.S. Appl. No. 09/818,157.
U.S. Official Action dated Mar. 17, 2005 in U.S. Appl. No. 09/841,265.
U.S. Official Action dated Mar. 24, 2005 in U.S. Appl. No. 10/141,712.
U.S. Official Action dated Apr. 8, 2005 in U.S. Appl. No. 10/164,960.
U.S. Official Action dated Apr. 19, 2005 in U.S. Appl. No. 09/841,266.
U.S. Official Action dated May 6, 2005 in U.S. Appl. No. 09/907,418.
U.S. Official Action dated May 20, 2005 in U.S. Appl. No. 10/184,298.
U.S. Official Action dated Jun. 3, 2005 in U.S. Appl. No. 10/154,630.
U.S. Official Action dated Jun. 6, 2005 in U.S. Appl. No. 10/164,260.
U.S. Official Action dated Jun. 24, 2005 in U.S. Appl. No. 10/140,544.
U.S. Official Action dated Jul. 25, 2005 in U.S. Appl. No. 10/179,438.
U.S. Official Action dated Sep. 2, 2005 in U.S. Appl. No. 10/366,141.
U.S. Official Action dated Oct. 4, 2005 in U.S. Appl. No. 10/183,317.
U.S. Official Action dated Oct. 5, 2005 in U.S. Appl. No. 10/179,810.
U.S. Official Action dated Oct. 20, 2005 in U.S. Appl. No. 09/906,552.
U.S. Official Action dated Nov. 2, 2005 in U.S. Appl. No. 10/184,190.
U.S. Official Action dated Nov. 10, 2005 in U.S. Appl. No. 10/164,260.
U.S. Official Action dated Nov. 15, 2005 in U.S. Appl. No. 09/841,265.
U.S. Official Action dated Nov. 22, 2005 in U.S. Appl. No. 10/141,712.
U.S. Official Action dated Dec. 5, 2005 in U.S. Appl. No. 09/907,418.
U.S. Official Action dated Dec. 14, 2005 in U.S. Appl. No. 10/608,267.
U.S. Official Action dated Dec. 15, 2005 in U.S. Appl. No. 10/155,680.
U.S. Official Action dated Jan. 11, 2006 in U.S. Appl. No. 09/841,266.
U.S. Official Action dated Jan. 17, 2006 in U.S. Appl. No. 10/140,544.
U.S. Official Action dated Feb. 16, 2006 in U.S. Appl. No. 10/184,298.
U.S. Official Action dated Sep. 7, 2006 cited in U.S. Appl. No. 10/155,680.
U.S. Final Official Action dated Aug. 18, 2006 cited in U.S. Appl. No. 09/907,418.
U.S. Official Action dated Aug. 9, 2006 in U.S. Appl. No. 10/164,960.
U.S. Final Official Action dated Jul. 19, 2006 in U.S. Appl. No. 09/906,552.
U.S. Official Action dated Aug. 2, 2006 in U.S. Appl. No. 10/731,899.
U.S. Appl. No. 10/426,446, filed Apr. 29, 2003, entitled "Methods and System for Recognizing Names in a Computer-Generated Document and for Providing Helpful Actions Associated with Recognized Names", Inventors: Feinberg et al.
*Microsoft Computer Dictionary*, Microsoft, Microsoft Press, Fifth Edition, p. 409.
Paul Cornell: "Developing Smart Tag DLLs" MSDN Library, 'Online!, Apr. 2001.
European Communication dated Sep. 25, 2006 in EP 03 01 4181.
World Wide Web Consortium, "Document Object Model (DOM) Level 2 Events Specification, Version 1.0", http://www.w3.org/TR/2000/REC-DOM-Level-2-Events-20001113/DOM2-Events.pdf, Nov. 2000, 50 pp.
World Wide Web Consortium, "Document Object Model (DOM) Level 2 Core Specification, Version 1.0", http://www.w3.org/TR/2000/REC-DOM-Level-2-Core-20001113/DOM2-Core.pdf, Nov. 2000, 107 pp.
European Communication dated Nov. 9, 2006 in EP 03010292.5.
"Word 2002 Add in: measurement Converter Smart Tag", http://www.microsoft.com/downloads/details.aspx?FamilyID=f67fc42c-5f41-4c3f-9d5a-71354471dc32&DisplayLang=en, retrieved on Nov. 9, 2006, 2 pgs.
"Microsoft Measurement Converter Smart Tag—Chinese Version", http://www.jiyang.gov/cn/laiying/My%20Pictures/%E8%B4%E5%BA%86%E8%BE%89/office2003/FILES/PFILES/COMMON/MSSHARED/SMARTTAG/CMEASURE/1033/CHMCABT.HTM, retrieved on Nov. 7, 2006, 2 pgs.
U.S. Office Action dated Nov. 9, 2006 cited in U.S. Appl. No. 10/184,298.
U.S. Office Action dated Nov. 15, 2006 cited in U.S. Appl. No. 10/179,438.
U.S. Official Action dated Dec. 20, 2006 in U.S. Appl. No. 10/154,630.
U.S. Final Official Action dated Dec. 26, 2006 in U.S. Appl. No. 10/179,810.
U.S. Official Action dated Jan. 5, 2007 in U.S. Appl. No. 10/183,717.
U.S. Official Action dated Jan. 11, 2007 in U.S. Appl. No. 10/184,190.
U.S. Official Action dated Jan. 25, 2007 in U.S. Appl. No. 10/608,267.
European Communication dated Nov. 17, 2006 in EP 03 011 851.7 - 2211.
European Communication dated Feb. 16, 2007 cited in European Application No. 04 003 683.2-2211.
Anonymous, "Adding Data from Other Sources in PowerPoint 2002," Jul. 2002, Internet article, XP-002420700, A Professional Approach Series the E-Zine Approach, http://www.glencoe.com/ps/computered/pas/article.php4?articleld-437, 8 pgs.
Rice, F.C., "Transform XML Files with XSLT When Importing into Microsoft Excel 2002," Jul. 2001, Internet article, XP-002420701, http://msdn2.microsoft.com/en-us/library/aa140055(office.10,d=printer).aspx, 9 pgs.
Johnson, L., "What's So Special About Paste Special?", Jun. 2002, Internet article, XP-002420702, http://pubs.logicalexpressions.com/Pub0009/LPMArticle.asp?ID=40, 5 pgs.
Anonymous, "Moving and Copying Text Tutorial," Aug. 17, 2001, Internet Article, XP-002307566, http://tutorials.findtutorials.com/read/category/102/id/342/p/3, 4 pgs.
U.S. Official Action dated Mar. 9, 2007 cited in U.S. Appl. No. 10/426,446.
U.S. Official Action dated Mar. 12, 2007 cited in U.S. Appl. No. 10/141,712.
U.S. Official Action dated Apr. 10, 2007 cited in U.S. Appl. No. 09/907,418.
European Communication dated Dec. 11, 2006 in EP 03 012 830.0 -2211.
Singapore Search Report/Written Opinion dated Jan. 26, 2007 in SG 200500214-2.
U.S. Official Action dated Feb. 6, 2007 cited in U.S. Appl. No. 09/588,411.

U.S. Official Action dated Feb. 7, 2007 cited in U.S. Appl. No. 10/179,438.
U.S. Official Action dated Feb. 21, 2007 cited in U.S. Appl. No. 10/366,141.
U.S. Final Office Action dated Jul. 16, 2007 cited in U.S. Appl. No. 10/164,960.
U.S. Office Action dated Aug. 10, 2007 cited in U.S. Appl. No. 10/179,810.
U.S. Office Action dated Sep. 10, 2007 cited in U.S. Appl. No. 10/179,438.
U.S. Appl. No. 11/924,856, filed Oct. 26, 2007 entitled "Providing Contextually Sensitive Tools and Help Content in Computer-Generated Documents".
U.S. Final Office Action dated Dec. 26, 2007 cited in U.S. Appl. No. 09/841,265.
U.S. Office Action dated Dec. 26, 2007 cited in U.S. Appl. No. 10/377,258.
U.S. Final Office Action dated Jan. 7, 2008 cited in U.S. Appl. No. 10/179,438.
U.S. Office Action dated Feb. 8, 2008 cited in U.S. Appl. No. 10/141,712.
U.S. Office Action dated Feb. 15, 2008 cited in U.S. Appl. No. 10/731,899.
U.S. Final Office Action dated Feb. 20, 2008 cited in U.S. Appl. No. 10/154,630.
Singapore Examination Reported (conducted by Austrian Patent Office) dated Jan. 25, 2008 cited in SG Application No. 200500214-2.
Chinese Official Action dated Dec. 28, 2007 cited in Application No. 200410005390.8.
Chinese Official Action dated Jan. 4, 2008 cited in Application No. 200510009487.0.
Wei Ying-bin et al., "A New Technology ColdFusion of Realizing Dynamic Webpage," 2000, 6 pgs. (English language translation, pp. 1-6).
European Examination Report dated Mar. 4, 2006 cited in EP Application No. 02 014 717.9-1527.
European Examination Report dated Mar. 4, 2006 cited in EP Application No. 03 012 432.5-1527.
U.S. Official Action mailed Apr. 1, 2008 cited in U.S. Appl. No. 09/907,418.
U.S. Official Action mailed Apr. 4, 2008 cited in U.S. Appl. No. 10/155,680.
U.S. Official Action mailed Apr. 29, 2008 cited in U.S. Appl. No. 09/588,411.
U.S. Final Official Action mailed Apr. 29, 2008 cited in U.S. Appl. No. 10/179,810.
U.S. Official Action mailed May 1, 2008 cited in U.S. Appl. No. 10/183,317.
European Communication Summons to Attend Oral Proceedings dated Mar. 4, 2008 in EP 05 000 506.5-1527.
European Communication Summons to Attend Oral Proceedings dated Mar. 10, 2008 in EP 03 01 0292.5-1527.
Rubin, C., "Microsoft Word 2000 Official Manual", First Edition, Nikkei BP Soft Press, Inc., Aug. 2, 1999, pp. 215-217.
U.S. Office Action dated May 27, 2008 cited in U.S. Appl. No. 09/906,552.
U.S. Examiner's Answer BPAI dated Jun. 5, 2008 cited in U.S. Appl. No. 10/184,298.
U.S. Office Action dated Jun. 11, 2008 cited in U.S. Appl. No. 09/841,265.
U.S. Office Action dated Jun. 12, 2008 cited in U.S. Appl. No. 10/426,446.
U.S. Office Action dated Jun. 13, 2008 cited in U.S. Appl. No. 10/780,376.
U.S. Final Office Action dated Jun. 27, 2008 cited in U.S. Appl. No. 10/377,258.
M. Stowe, "XML in Excel and the Spreadsheet Component", Microsoft Corporation, Aug. 2001, 6 pgs.
C. Heinemann, "Cross-Reference your XML Data", Microsoft Corporation, Dec. 7, 1998, 6 pgs.
D. Obasanjo, "XML_Namespaces and How They Affect Xpath and XSLT", Microsoft Corporation, May 20, 2002, 19 pgs.
European Communication Summons to Attend Oral Proceedings dated May 7, 2008 cited in European Application No. 04002224.6.
Russian Official Action dated Mar. 13, 2008 cited in Russian Application No. 2004104096/09(004398).
Japanese Official Action dated Mar. 28, 2008 cited in Japanese Application No. 2003-178497.
Pixley, "Document Object Model (DOM) Level 2 Events Specification Version 1.0", World Wide Web Consortium, Nov. 13, 2000, www.w3.org/TR/2000/REC-DOM-Level-2-Events-20001113/DOM2-Events.pdf.
European Communication dated Jun. 3, 2008 cited in European Application No. 03 011 851.7-2211.
Japanese Official Action dated Apr. 18, 2008 cited in Japanese Application No. 2003-128417.
Russian Official Action dated Jan. 11, 2008 cited in Russian Application No. 2004105880/09(006292).
V. Doroth et al., "Modern Computer Vocabulary," St. Petersburg, BHV-Peterburg, 2001, p. 465 (with English language translation).
U.S. Office Action dated Jan. 25, 2008 cited in U.S. Appl. No. 10/608,267.
Russian Official Action dated Oct. 11, 2008 cited in Russian Application No. 2003118722.
Pershikov, V.I., "Explanatory Dictionary in Informatics," Finances and Statistics, Moscow, 1991 (in Russian with translated sections) 5 pgs.
U.S. Final Office Action dated Dec. 18, 2007 cited in U.S. Appl. No. 10/366,141.
Design methodology and formal validation of hypermedia documents; C.A.S. Santos, L.F.G. Soares, G.L. de Souza and J.P. Courtiat; *Proceedings of the sixth ACM international conference on multimedia*, (1998) p. 39-48.
Constructing, organizing, and visualizing collections of tropically related Web resources; Loren Terveen, Will Hill and Brian Amento; *ACM Trans. Comput.-um. Interact.* 6, 1 (Mar. 1999) p. 67-94.
How to personalize the Web; Rob Barrett, Paul P. Maglio and Daniel C. Kellem; *Conference proceedings on human factors in computing systems* (1997) p. 75-82.
CLUES: dynamic personalized message filtering; Matthew Marx and Chris Schmandt; *Proceedings of the ACM 1996 conference on computer supported cooperative work* (1996) p. 113-121.
Dynamic hyperlink generation for navigation in relational databases; Karl M. Goschka and Jurgen Falb; *Proceedings of the tenth ACM conference on hypertext and hypermedia: returning to our diverse roots* (1999) p. 23-24.
Percepual user interfaces: perceptual intelligence; Alex Pentland; *Commun. ACM* 43, 3 (Mar. 2000) p. 35-44.
Textual context analysis for information retrieval; Mark A. Stairmand; *Proceedings of the 20th annual international ACM SIGIR conference on research and development in information retrieval* (1997) p. 140-147.
An XML framework for agent-based E-commerce; Robert J. Glushko, Jay M. Tenenbaum and Bart Meltzer; Commun. ACM 42, 3 (Mar. 1999) p. 106.
U.S. Official Action dated Sep. 28, 2006 cited in U.S. Appl. No. 10/608,267.
U.S. Final Official Action dated Oct. 5, 2006 cited in U.S. Appl. No. 09/841,266.
U.S. Official Action dated Oct. 6, 2006 cited in U.S. Appl. No. 10/140,544.
U.S. Official Action dated Oct. 10, 2006 cited in U.S. Appl. No. 09/841,265.
European Communication dated Apr. 19, 2006 in EP 05 000 506.5-1527.
European Preliminary Opinion dated Aug. 27, 2008 cited in European Application No. 04002224.6-1527/1447754.
Polish Official Letter dated Jun. 24, 2008 cited Polish Application No. P 365553.
U.S. Final Office Action dated Jul. 29, 2008 cited in U.S. Appl. No. 10/141,712.
"XML Schema Part 2: Datatypes," W3C, May 2, 2001, http://www.w3.org/TR/2001/REC-xmlschema-2-20010502/, pp. 1-146 (separated into 2 documents — A & B).

U.S. Office Action dated Aug. 1, 2008 cited in U.S. Appl. No. 10/366,141.
Polish Official Action dated Jul. 21, 2008 cited in Polish Application No. P 364854.
Japanese Office Action dated Jul. 18, 2008 cited in Japanese Application No. 2002-207514.
"The Spatial Smart Tag", Geomatic Technologies, Mar. 10, 2005, 2 pp.
Harmon, D., "Microsoft MapPoint 2002", Geoworld Quick-Take Reviews, Aug. 2001, 3 pp.
Irie R. et al., "Resources for Place Name Analysis", May 28, 2004, 4 pp.
Rajabifard, A. et al., "Creating an Enabling Platform for the Delivery of Spatial Information", Spatial Sciences Institute Biennial Conference, Sep. 12, 2005, 10 pp.
Camarda, B., Special Editing Using® Microsoft® Office Word 2003, Que, Dec. 12, 2003, pp. 1-5.
Ivens, K., Office XP Smart Tags, Microsoft, Mar. 6, 2002, pp. 1-4.
Frye, C., Microsoft Office Systems: Step by Step, Microsoft Press, 2003 Edition, Sep. 3, 2003, pp. 1-6.
U.S. Official Action mailed Sep. 8, 2006 in U.S. Appl. No. 10/948,948.
U.S. Official Action mailed Feb. 15, 2007 in U.S. Appl. No. 10/948,948.
U.S. Official Action mailed Oct. 18, 2007 in U.S. Appl. No. 10/948,948.
U.S. Official Action mailed Mar. 20, 2008 in U.S. Appl. No. 10/948,948.
U.S. Official Action mailed Oct. 16, 2008 in U.S. Appl. No. 16/948,948.
U.S. Official Action mailed Oct. 16, 2008 in U.S. Appl. No. 10/154,630.
European Search Report dated Dec. 12, 2006 in European Application No. 05 105 000.3-1527.
European Examination Report dated Oct. 9, 2007 in European Application.No. 05 105 000.3-1527.
Chinese Official Action dated Dec. 7, 2007 in Chinese Application No. 200510088529.4.
Chinese Second Official Action dated Aug. 15, 2008 in Chinese Application No. 200510088529.4.
Chilean Second Office Action cited in Chilean Application No. 67-2005.
Polish Official Action dated Aug. 27, 2008 in Polish Application No. P360520.
Malaysian Official Action dated Aug. 29, 2008 cited in Malaysian Application No. PI 20031902.
European Communication Minutes of Oral Proceedings and Decision dated Sep. 15, 2008 in European Application No. 05 000 506.5-1527.
Polish Second Official Action dated Oct. 28, 2008 in Polish Application No. P36553.
Japanese Office Action dated Oct. 10, 2008 cited in Application No. 2004-037158.
Chinese Office Action dated Oct. 17, 2008 cited in Application No. 03145242.6.
U.S. Final Office Action dated Dec. 8, 2008 cited in U.S. Appl. No. 10/183,317.
Australian First Official Action dated Oct. 21, 2008 cited in Application No. 2003204800.
U.S. Final Office Action dated Dec. 24, 2008 cited in Application No. 09/841,265.
Sharon Oviatt et al., "Integration and Synchronization of Input Modes during Multimodal Human-Computer Interaction," CHI 97, Atlanta, Georgia, Mar. 22-27, 1997, pp. 415-422.
U.S. Office Action dated Dec. 23, 2008 cited in U.S. Appl. No. 10/179,810.
U.S. Office Action dated Jan. 5, 2009 cited in U.S. Appl. No. 10/141,712.
European Statement regarding Grounds of Appeal dated Jan. 13, 2009 cited in Application No. 04 002 224.6.
(Previously cited) Koyaku, H., "What is Brought to SQL Server 2000 by XML, Part 1: Function of XML Provided by SQL Server 2000", Enterprise Servers World, vol. 3, No. 12, IDG Japan, Inc., Dec. 1, 2000, pp. 42-53 (with English language translation).
U.S. Final Office Action dated Jan. 22, 2009 cited in U.S. Appl. No. 10/366,141.
U.S. Office Action dated Feb. 4, 2009 cited in U.S. Appl. No. 10/377,258.
U.S. Final Office Action dated Mar. 4, 2009 cited in U.S. Appl. No. 10/780,376.
European Summons to Attend Oral Proceedings dated Feb. 26, 2009 cited in European Application No. 0301283.0-2211.
European Communication dated Mar. 18, 2009 cited in European Application No. 04003683.2-2211.
European Summons to Attend Oral Proceedings dated Mar. 20, 2009 cited in European Application No. 03012830.0.
Australian First Examiner's Report dated Sep. 15, 2008 cited in Australian Application No. 2003204379.
Japanese Final Official Action dated Nov. 25, 2008 cited in Japanese Application No. 2002-207514.
Japanese Official Action dated Feb. 6, 2009 cited in Japanese Application No. 2003-180218.
Japanese Official Action dated Feb. 13, 2009 cited in Japanese Application No. 2003-162911.
Japanese Official Action dated Feb. 24, 2009 cited in Japanese Application No. 2003-161338.
Japanese Official Action dated Mar. 6, 2009 cited in Japanese Application No. 2004-042140.
Mexican Official Action dated Feb. 11, 2009 cited in Application No. PA/a/2003/005451.
Chinese Final Rejection dated Mar. 13, 2009 cited in Application No. 03145242.6.
Japanese Final Rejection dated Mar. 17, 2090 cited in Application No. 2004-037158.
Japanese Final Rejection dated Apr. 3, 2009 cited in Application No. 2002-207514.
U.S. Office Action dated Apr. 20, 2009 cited in U.S. Appl. No. 10/426,446.
U.S. Office Action dated Apr. 27, 2009 cited in U.S. Appl. No. 10/154,630.
Japanese Official Action dated May 26, 2009 cited in Application No. 2005-039754.
Chinese Decision on Rejection dated Jul. 3, 2009 cited in Application No. 0314003.1.
European Summons to Attend Oral Proceedings dated Aug. 5, 2009 cited in Application No. 03003931.7.
Polish Official Notice dated Aug. 25, 2009, cited in Application No. P.365553/DP.
Australian Official Action dated Sep. 11, 2009 cited in Application No. 2003204478.
Norwegian Official Action dated Aug. 24, 2009 cited in Application No. 2003 2550.
Polish Official Notice dated Sep. 22, 2009 cited in Application No. P. 364854/DP.
Polish Official Notice dated Sep. 23, 2009 cited in Application No. P. 360520/DP.
Korean Official Action dated Sep. 30, 2009 cited in Application No. 10-2003-40988.
U.S. Office Action dated Oct. 22, 2009 cited in U.S. Appl. No. 10/377,258.
Japanese Official Notice of Final Rejection dated Oct. 27, 2009 cited in Application No. 2003-161338.
Russian Official Action dated Jun. 21, 2009 cited in Application No. 2005104223/09(005505).
D. Richter, "Windows for professionals" (Win 32 API programming for Windows NT 3.5 and Windows 95, translation from English, Moscow: Russian Edition, 1995, ISBN 5-7502-0010-8, pp. 26, 31, 215.
U.S. Final Office Action dated Nov. 30, 2009 cited in U.S. Appl. No. 10/179,810.

Malaysian Examination Report dated Nov. 30, 2009 cited in Application No. PI 20040559.
Australian Third Official Action dated Dec. 23, 2009 cited in Application No. 2003204478.

Australian First Official Action Report dated Jan. 18, 2009 cited in Application No. 2004200459.

* cited by examiner

APPLICATION PROGRAM INTERFACES FOR SEMANTICALLY LABELING STRINGS AND PROVIDING ACTIONS BASED ON SEMANTICALLY LABELED STRINGS

REFERENCE TO RELATED APPLICATIONS

This is a continuation-in-part of U.S. patent application Ser. No. 09/588,411, entitled "METHOD AND SYSTEM FOR SEMANTICALLY LABELING STRINGS AND PROVIDING ACTIONS BASED ON SEMANTICALLY LABELED STRINGS", filed Jun. 6, 2000, which is incorporated by reference herein.

TECHNICAL FIELD

This invention relates to application program interfaces for semantically labeling strings of text during creation of an electronic document and providing a selection of actions that may be performed based on the semantically labeled strings.

BACKGROUND OF THE INVENTION

Electronic documents such as word processing documents and spreadsheet documents typically include semantic information that would be helpful if the information was recognized as such. Recognition and use of this semantic information could result in increased interoperability between desktop software applications and other desktop applications and/or web-based applications.

The ability to recognize strings of text, such as in search engines, is well-known. Additionally, various information retrieval systems have capabilities to label documents. For example, the LEXIS-NEXIS service provides links in some of its documents for company names, famous people and stock ticker symbols.

However, none of the services described above allow strings of text to be labeled with semantic information on-the-fly, i.e., as a user is typing text into a document and creating a document. Thus, there is a need for a method and system for semantically labeling strings while a user is creating a document and providing user actions based on the type of semantic label applied to the string. There is further a need for application program interfaces (API) for labeling strings while a user is creating a document and providing user actions based on the type of semantic label applied to the string.

It is with respect to these considerations and others that the present invention has been made.

SUMMARY OF THE INVENTION

The present invention provides application program interfaces (API) for labeling strings while a user is creating a document and providing user actions based on the type of semantic label applied to the string. A recognizer API is provided and includes properties and methods or instructions which allow recognizer plug-ins of a recognizer dynamic-link library (DLL) to semantically label strings of text or cells or information. An action API is provided and includes properties and methods that are called upon when a user initiates particular actions such as opening a web browser, going to a particular URL, or opening an instance of a word processing or spreadsheet program.

These and other features, advantages, and aspects of the present invention may be more clearly understood and appreciated from a review of the following detailed description of the disclosed embodiments and by reference to the appended drawings and claims.

DETAILED DESCRIPTION

Figure 1:
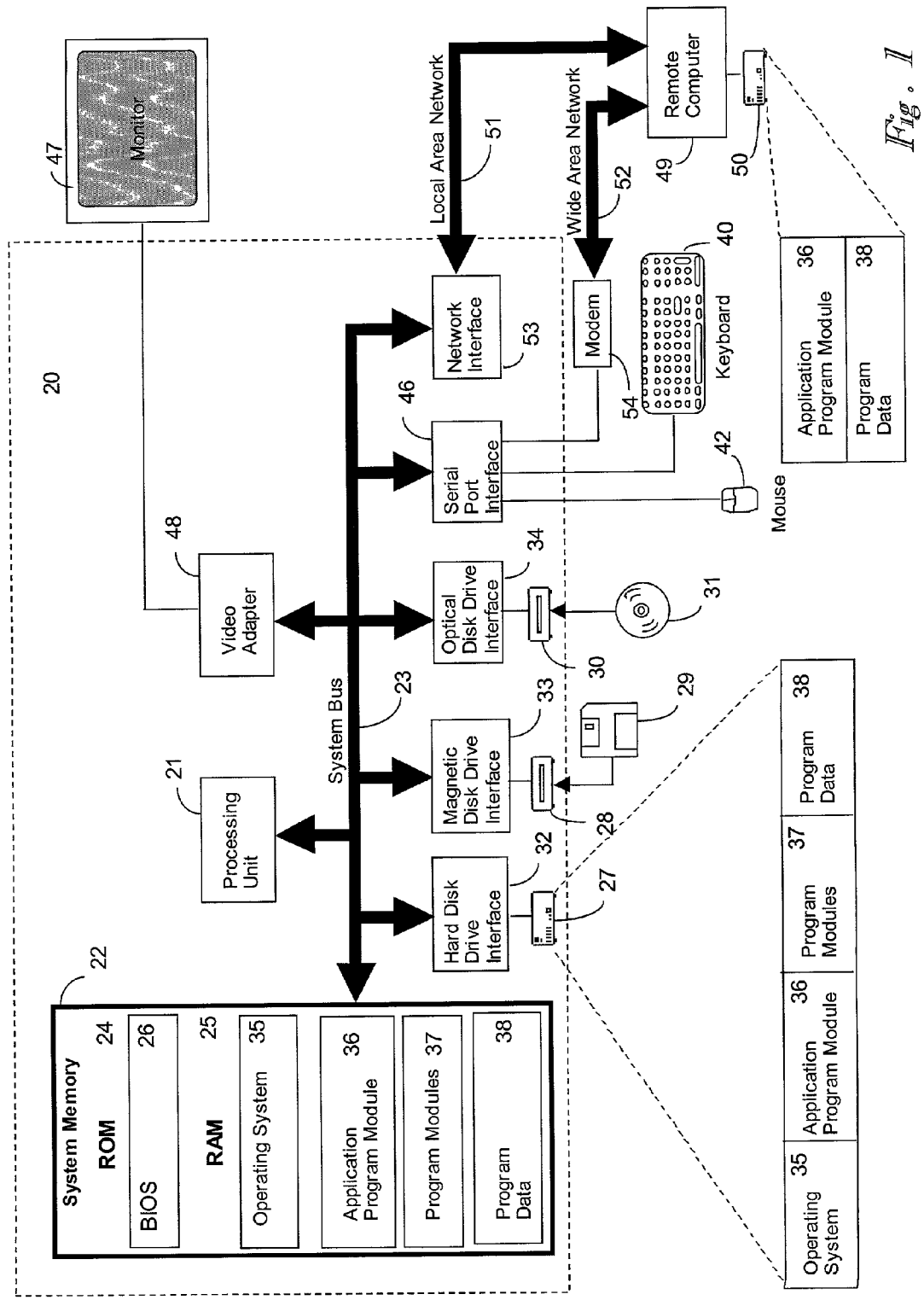
FIG. 1 is a block diagram of a computer that provides the exemplary operating environment for the present invention.

The present invention is directed toward application program interfaces (API) for labeling strings while a user is creating a document and providing user actions based on the type of semantic label applied to the string. A recognizer API is provided and includes properties and methods or instructions which allow recognizer plug-ins of a recognizer dynamic-link library (DLL) to semantically label strings of text or cells or information. An action API is provided and includes properties and methods that are called upon when a user initiates particular actions such as opening a web browser, going to a particular URL, or opening an instance of a word processing or spreadsheet program. A string is defined as a data structure composed of a sequence of characters usually representing human-readable text.

After the strings are annotated with a type label, application program modules may use the type label to provide users with a choice of actions. If the user's computer does not have any actions associated with a type label, the user may be provided with the option to surf to a download Uniform Resource Locator (URL) and download action plug-ins for that type label. One or more recognizer plug-ins perform the recognition of particular strings in an electronic document. The recognizer plug-ins may be packaged with an application program module or they may be written by third parties to recognize particular strings that are of interest. One or more action plug-ins provide possible actions to be presented to the user based upon the type label associated with the string.

In one embodiment, the invention is incorporated into a suite of application programs referred to as "OFFICE", and more particularly is incorporated into a preferred word processing application program entitled "WORD 10.0", a preferred spreadsheet application program entitled "EXCEL 10.0", a preferred e-mail application program entitled "OUTLOOK 10.0" and a preferred web browser application program entitled "INTERNET EXPLORER 6", all marketed by Microsoft Corporation of Redmond, Wash. Briefly described, the preferred application programs allow a user to create and edit electronic documents by entering characters, symbols, graphical objects, and commands.

Strings are recognized and annotated, or labeled, with a type label. After the strings are annotated with a type label, application program modules may use the type label and other metadata to provide users with a choice of electronic commerce actions. If the user's computer does not have any actions associated with that type label, the user may be provided with the option to surf to a download Uniform Resource Locator (URL) and download action plug-ins for that type label.

Having briefly described an embodiment of the present invention, an exemplary operating environment for the present invention is described below.

Exemplary Operating Environment

Referring now to the drawings, in which like numerals represent like elements throughout the several figures, aspects of the present invention and the exemplary operating environment will be described.

FIG. 1 and the following discussion are intended to provide a brief, general description of a suitable computing environment in which the invention may be implemented. While the invention will be described in the general context of an application program that runs on an operating system in conjunction with a personal computer, those skilled in the art will recognize that the invention also may be implemented in combination with other program modules. Generally, program modules include routines, programs, components, data structures, etc. that perform particular tasks or implement particular abstract data types. Moreover, those skilled in the art will appreciate that the invention may be practiced with other computer system configurations, including hand-held devices, multiprocessor systems, microprocessor-based or programmable consumer electronics, cell phones, minicomputers, mainframe computers, and the like. The invention may also be practiced in distributed computing environments where tasks are performed by remote processing devices that are linked through a communications network. In a distributed computing environment, program modules may be located in both local and remote memory storage devices.

With reference to FIG. 1, an exemplary system for implementing the invention includes a conventional personal computer 20, including a processing unit 21, a system memory 22, and a system bus 23 that couples the system memory to the processing unit 21. The system memory 22 includes read only memory (ROM) 24 and random access memory (RAM) 25. A basic input/output system 26 (BIOS), containing the basic routines that help to transfer information between elements within the personal computer 20, such as during start-up, is stored in ROM 24. The personal computer 20 further includes a hard disk drive 27, a magnetic disk drive 28, e.g., to read from or write to a removable disk 29, and an optical disk drive 30, e.g., for reading a CD-ROM disk 31 or to read from or write to other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide nonvolatile storage for the personal computer 20. Although the description of computer-readable media above refers to a hard disk, a removable magnetic disk and a CD-ROM disk, it should be appreciated by those skilled in the art that other types of media which are readable by a computer, such as magnetic cassettes, flash memory cards, digital video disks, Bernoulli cartridges, and the like, may also be used in the exemplary operating environment.

A number of program modules may be stored in the drives and RAM 25, including an operating system 35, one or more application programs 36, a word processor program module 37 (or other type of program module), program data 38, and other program modules (not shown).

A user may enter commands and information into the personal computer 20 through a keyboard 40 and pointing device, such as a mouse 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a game port or a universal serial bus (USB). A monitor 47 or other type of display device is also connected to the system bus 23 via an interface, such as a video adapter 48. In addition to the monitor, personal computers typically include other peripheral output devices (not shown), such as speakers or printers.

The personal computer 20 may operate in a networked environment using logical connections to one or more remote computers, such as a remote computer 49. The remote computer 49 may be a server, a router, a peer device or other common network node, and typically includes many or all of the elements described relative to the personal computer 20, although only a memory storage device 50 has been illustrated in FIG. 1. The logical connections depicted in FIG. 1 include a local area network (LAN) 51 and a wide area network (WAN) 52. Such networking environments are commonplace in offices, enterprise-wide computer networks, intranets and the Internet.

When used in a LAN networking environment, the personal computer 20 is connected to the LAN 51 through a network interface 53. When used in a WAN networking environment, the personal computer 20 typically includes a modem 54 or other means for establishing communications over the WAN 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It will be appreciated that the network connections shown are exemplary and other means of establishing a communications link between the computers may be used.

Figure 2:
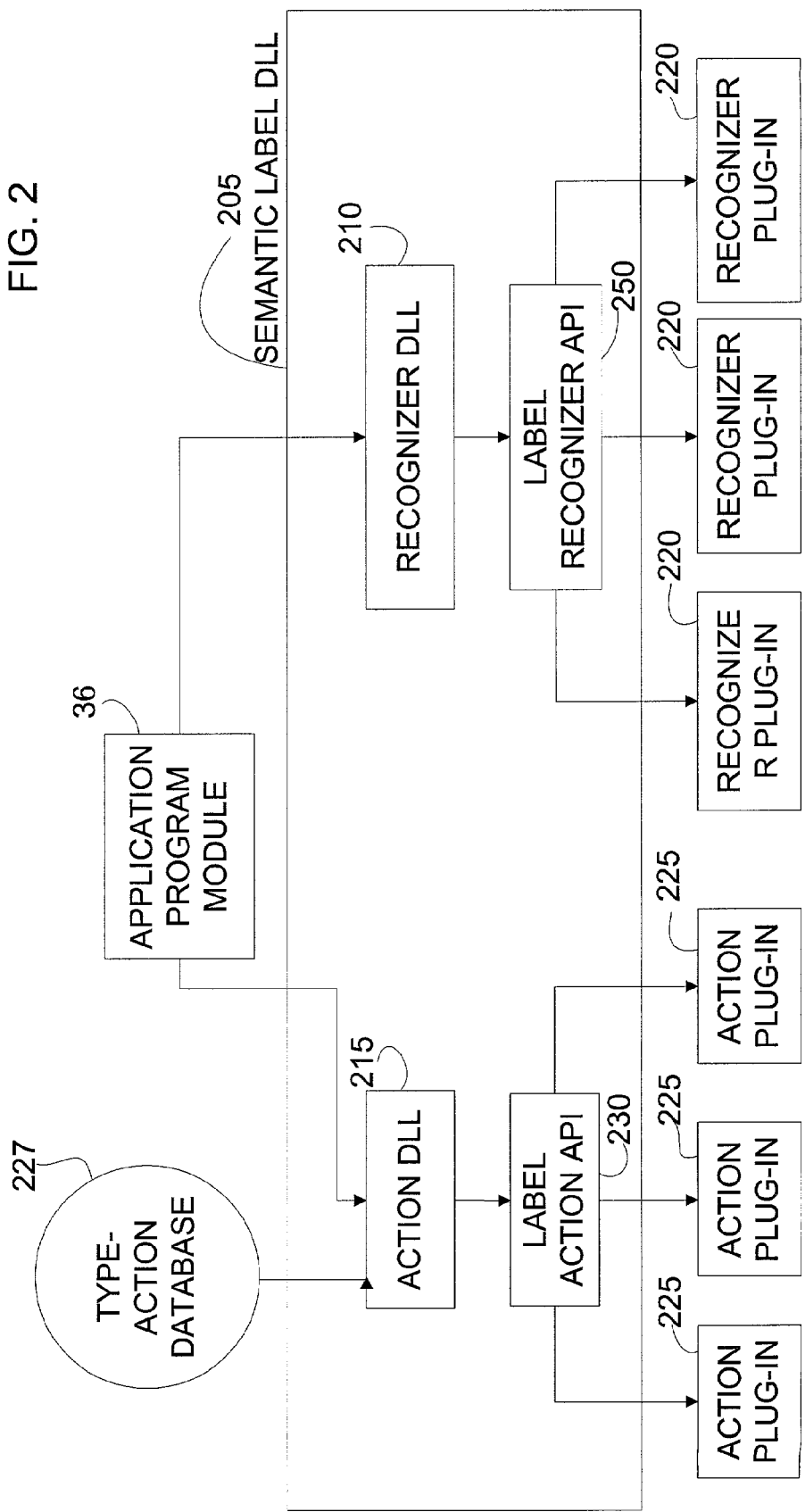
FIG. 2 is a block diagram illustrating an exemplary architecture for use in conjunction with an embodiment of the present invention.

FIG. 2 is a block diagram illustrating an exemplary architecture 200 for use in conjunction with an embodiment of the present invention. The architecture includes an application program module 36, such as word processor program module 37 (FIG. 1). The application program module 36 is able to communicate with a recognizer dynamic-link library 210 (hereinafter recognizer DLL) and an action dynamic-link library 215 (hereinafter action DLL) as a user is creating or editing an electronic document. According to a preferred embodiment, the recognizer DLL 210 and the action DLL 215 are combined in a semantic label DLL 205. The recognizer DLL 210 controls a number of recognizer plug-ins 220. The action DLL 215 controls a number of action plug-ins 225. The action DLL also controls a type-action database 227.

In a preferred embodiment, the action plug-ins and recognizer plug-ins are Automation Servers. Automation Servers are well-known software components which are assembled into programs or add functionality to existing programs running on the Microsoft WINDOWS® operating system. Automation Servers may be written in a variety of computing languages and may be un-plugged from a program at run time without having to recompile the program. It should also be understood that, in a preferred embodiment, the action DLL and recognizer DLL are merged into a single DLL.

The recognizer DLL 210 handles the distribution of strings from the electronic document running on the application program module 36 to the individual recognizer plug-ins 220. The recognizer plug-ins 220 recognize particular strings in an electronic document, such as a word processing document, a spreadsheet document, a web page, etc. The recognizer plug-ins 220 may be packaged with the application program module 36 or they may be written by third parties to recognize particular strings that are of interest. Typically, the recognizer DLL 210 passes strings to the recognizer plug-ins 220 in one paragraph or cell value increments.

As part of recognizing certain strings as including semantic information, the recognizer plug-ins 220 determine which strings are to be labeled and how they are to be labeled. After receiving these results from the various recognizer plug-ins 220, the recognizer DLL 210 sends semantic categories to the application program module. In a preferred embodiment, a semantic category comprises the recognized string, a type label, and a download URL. A semantic category may also comprise metadata. The recognizer plug-ins 220 each run separately and the recognizer DLL 210 is responsible for handling the asynchronicity that results from different recognizer plug-ins returning results with different delays.

After a string is labeled by a recognizer plug-in 220 and a semantic category is sent to the application program module 36, the user of the application program module 36 will be able to execute actions that are associated with the type label of the semantic category. The action DLL 215 manages the action plug-ins 225 that are run to execute the actions. As with the recognizer plug-ins 220, the action plug-ins 225 may be packaged with the application program module 36 or written by third parties to perform particular actions that are of interest to the third party. The action plug-ins provide possible actions to be presented to the user based upon the type label associated with the string. The action DLL 215 determines what type label the semantic category includes and cross-references the type label in the type-action database 227 with a list of actions to determine what actions to present to the user. It should be understood that, in a preferred embodiment, the type-action database is not used. Instead, the list of actions is dynamically generated for each type by looking in the registry to determine which actions are installed and then querying the action DLLs to determine which types they apply to.

After the user chooses an action, the action DLL 215 manages the appropriate action plug-ins 225 and passes the necessary information between the action plug-ins and the application program module 36 so that the action plug-in may execute the desired action. Typically, the application program module sends the action DLL an automation request to invoke the action the user has selected.

As described above, the combination of the recognized string, type label, metadata and download URL is referred to herein as a semantic category. The type label is a semantic information label. The semantic category may also comprise metadata, which are hidden properties of the semantic category. An example of a semantic category may clarify the definition. Suppose a user enters the text "Gone With the Wind" into an electronic document. The string "Gone With the Wind" may be identified as a semantic category of type label "Book Title" and of type label "Movie Title". In addition, metadata such as the ISBN number may be returned by the recognizer plug-in to the application program module as part of the semantic category. A download URL may be provided with the type labels "Book Title" and "Movie Title" in case the user's machine has not stored action plug-ins for these type labels. For example, an action for the type label "Book Title" may be "Buy this Book" from an online retailer. If the user does not have the action plug-in DLL 225 corresponding to "Buy this book", then the download URL may be used to navigate the user's web browser to an appropriate website to download this action plug-in. In other implementations of the invention, multiple download URLs may be provided for a single type label.

It should also be understood that the present invention, in a preferred embodiment, also recognizes sequences of capitalized words that contain function words, and which are likely to be special, but for which there is no type label information. These strings are typically labeled by a grammar checker program module.

The actions provided for a semantic category may utilize both the type label and the text of the recognized string. For example, a word processor program module may use a grammar checker as a recognizer plug-in to label strings that are person names. After a string has been labeled as a person's name, the word processor program module may, through a standard user interface mechanism, allow users to execute pertinent actions, such as looking up the person's name in the contacts folder in a personal information manager program module, sending electronic mail, or searching for the person's name in an HR database.

Having described an exemplary architecture, an exemplary method 300 for semantically labeling strings during document creation will be described below in reference to FIGS. 2 and 3.

Method for Semantically Labeling Strings During Document Creation

Figure 3:
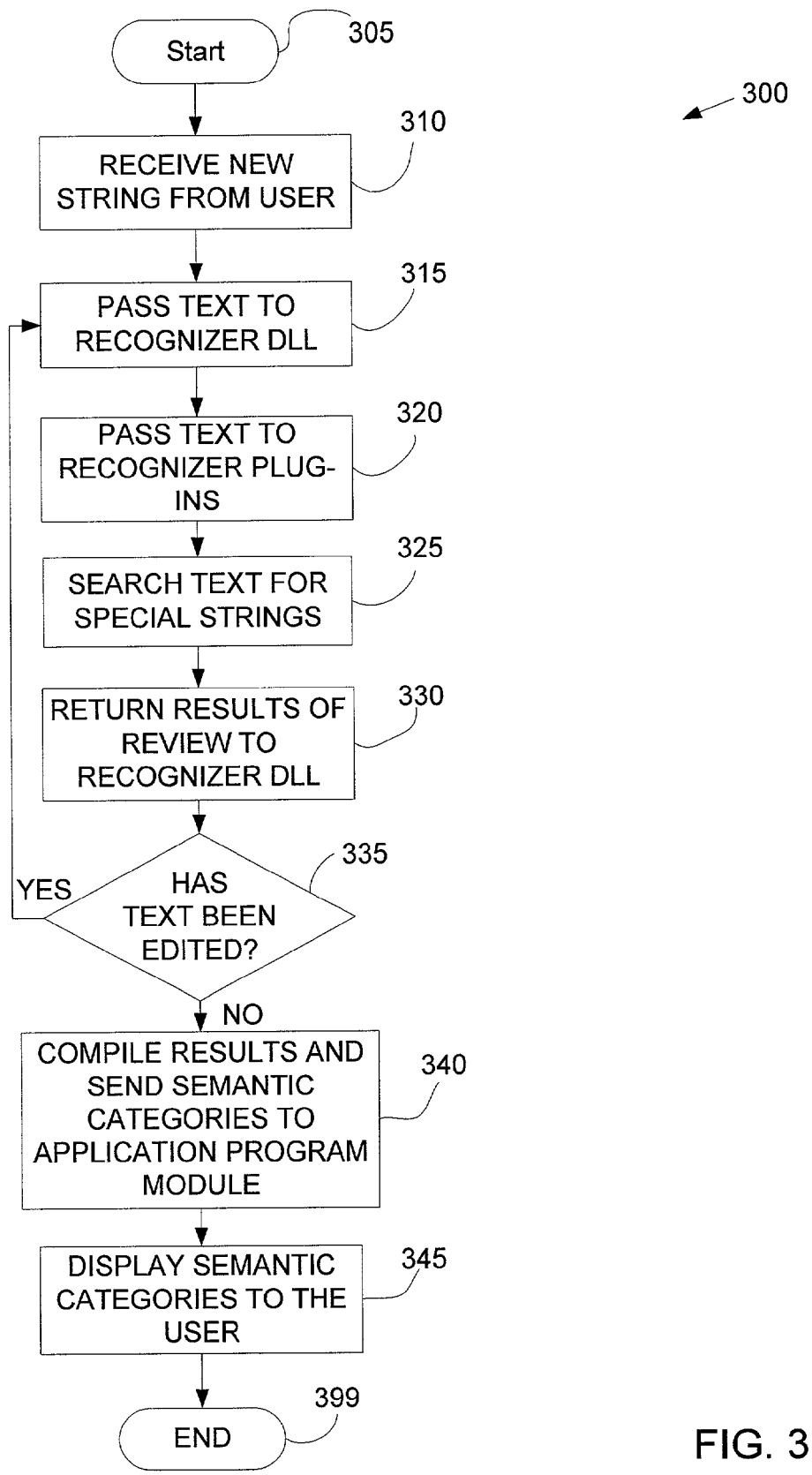
FIG. 3 is a flow chart illustrating a method for semantically labeling strings during creation of an electronic document.

FIG. 3 is a flow chart illustrating a method 300 for semantically labeling strings during creation of an electronic document. Those skilled in the art will appreciate that this is a computer-implemented process that is carried out by the computer in response to input from the user and instructions provided by a program module.

Referring to FIG. 3, the method 300 begins at start step 305 and proceeds to step 310 when a user opens an electronic document in application program module 36. In a preferred embodiment, the electronic document is a word processing document or a spreadsheet document. However, the invention is not limited to either of these specific types of electronic documents.

At step 310, the application program module 36 receives a new string, such as when the user enters text, for example a new paragraph, into the electronic document or edits a previously entered paragraph. The method 300 then proceeds to step 315.

At step 315, the paragraph containing the new string is passed from the application program module 36 to the recognizer DLL 210. The recognizer DLL is responsible for communicating with the application program module, managing the jobs that need to be performed by the recognizer plug-ins, receiving results from the recognizer plug-ins and sending semantic category information to the application program module. At boot time, the recognizer DLL communicates with its recognizer plug-ins to determine what languages it supports, what types it can apply, etc. It should be understood that, in a preferred embodiment, a paragraph is passed to the recognizer DLL at step 315. However, in alternative embodiments, a sentence, the contents of a spreadsheet cell, a section of the document, the entire document, etc. may be passed to the recognizer DLL. In other words, the present invention is not limited to simply passing a paragraph to the recognizer DLL. The method 300 then proceeds to step 320.

Still referring to step 315, the application program module 36 typically sends one paragraph at a time to the recognizer DLL. In addition, in a preferred embodiment, a grammar checker program module sends all semantic categories (without type labels) to the recognizer DLL that have been identified by the grammar checker program module. Passing these semantic categories (without type labels) to the recognizer DLL is important because doing so saves each recognizer plug-in from needing to decide whether something is a capitalized string interspersed with function words (a task that would require writing a number of regular expressions: Cap Cap Unc Cap; Cap Unc Cap; etc.). If a label is applied by a recognizer plug-in to a string the grammar checker program module labeled, the grammar checker label will then be removed.

At step 320, during idle time, the paragraph (and information from the grammar checker program module) is passed to the recognizer plug-ins. The method then proceeds to step 325.

It should be understood that, in a preferred embodiment, the recognizer DLL 210 maintains a job queue. If before the recognizer DLL 210 sends the paragraph to the recognizer plug-ins 220 the user edits the paragraph, then the job containing the edited paragraph is deleted and is not sent to the recognizer plug-ins. Then, a new job enters the queue at step 315 after the edited paragraph is received at step 310. This job deletion is necessary to prevent the recognizer plug-ins from performing unnecessary work on a paragraph that has been edited.

At step 325, the recognizer plug-ins are executed on the text to search for special strings. For example the recognizer plug-ins are executed on the paragraph to recognize keywords or perform other actions defined by the recognizer plug-in. As part of executing the recognizer plug-in, the paragraph may be broken into sentences by the recognizer plug-in. However, each recognizer plug-in is responsible for its own sentence-breaking. After the keywords are found at step 325, then the method proceeds to step 330.

At step 330, the results from each of the recognizer plug-ins are received by the recognizer DLL. The method then proceeds to decision step 335.

At decision step 335, it is determined whether the paragraph that has been reviewed by the recognizer plug-ins has been edited after the paragraph was sent to the recognizer DLL. If so, then the method 300 returns to step 315 and the edited paragraph is received by the recognizer DLL from the application program module. If not, then the method proceeds to step 340.

At step 340, the results from the recognizer plug-ins are compiled into semantic categories by the recognizer DLL and the semantic categories are sent to the application program module. At step 345, the application program module displays the semantic categories to the user in the electronic document. The method 300 then ends at step 399.

As should be understood from the above description, the architecture for recognizing semantic categories permits third parties to develop recognizer plug-ins to identify strings of one or more particular types. The recognizer plug-ins communicate with the application program module and receive a string from the application program module. The recognizer plug-ins may apply recognition algorithms to the string and communicate the identity of recognized strings back to the application program module.

After a string is labeled with a particular type label, the user will be able to execute action plug-ins that pertain to that type label. The action plug-ins preferably are COM objects that are executed via communication between the application program module and the action DLL. Parameters necessary to execute the action (the XML of the string labeled as being of a particular type, the XML of the string representing the current selection) will be passed from the application program module to the action DLL and, in turn, passed to the action plug-in.

Actions Assigned to Type Labels

An architecture for identifying and executing a set of actions associated with a semantic category may also be provided. This architecture comprises actions that apply to a particular type label (e.g. an action for book titles may be "Buy this book from shop.Microsoft.com") and executing those actions when the user so desires. An action is a user-initiated function applied to a typed string. For example, adding a name to the contacts folder is one action possible for a type label "Person name".

There is power and flexibility that results from allowing third party vendors, such as IT professionals, to design and write recognizer plug-ins and action plug-ins for deployment within an organization or for deployment on the World Wide Web. Some example actions that may be executed include:

Schedule a meeting
Create task
Display calendar
Add to contacts folder
Look up in contacts folder, address book, Windows Address Book (WAB), Global Address List (GAL), etc.
Insert address into document
Send mail to
Display EXPEDIA map
Stock quote lookup
Send instant message to Different actions may be assigned to different type labels and these type label-action assignments may be stored in the type-action database 227. Table 1 below illustrates some possible type label-action pairings.

TABLE 1

| Type Labels | Actions |
| --- | --- |
| Person name | Show contact info |
|  | Add to contacts |
|  | E-mail |
|  | Insert address into document |
|  | Send instant message to |
| Date | Show calendar for that day |
|  | New task with that due date |
|  | Schedule meeting that day |
| Place | Display EXPEDIA map |
|  | Add to contacts |
| Address | Add to contacts |
| Phone number | Add to contacts |
| E-mail | Add to contacts |
| Date | Schedule a meeting |
| Task | Schedule a task |
| Meeting | Schedule a meeting |

For each type label, the type-action database 227 may store a download URL specified by the creator of the type label that users who do not have action-plug-ins or recognizer plug-ins for that semantic category type can go to in order to get action plug-ins and/or recognizer plug-ins. For example, the download URL for the type label "Book Title" might be microsoft.com/semanticcategories.asp. Once at that web page, a user may be offered downloads of various action plug-ins and recognizer plug-ins. There may also be an option on the user interface to navigate to the download URL so that recipients of documents with semantic categories can easily get the action plug-ins for those semantic categories.

Storing Semantic Categories

Semantic categories may be stored as part of the electronic document along with other document information and may be available when a document is transmitted from one computer to another computer. In a preferred embodiment, storing semantic categories in an electronic document is controlled by an "Embed semantic categories" checkbox. The checkbox is on by default. Turning it off will prevent semantic categories in the document from being saved. The state of the checkbox is per document. The same checkbox controls saving for both .htm and .doc documents.

Checking a "Save semantic categories as XML properties" checkbox (off by default) will write out the text of all of the semantic categories in the document and their labels in the header of the HTML file in XML (that is using the same tags as are used inline, but surrounded by <xml> And </xml>) for easy identification and parsing by search engines and knowledge management systems.

Semantic categories may be saved as a unique namespace plus a tag name. A namespace is an XML construct for uniquely identifying a group of XML tags that belong to a logical category. Thus, every semantic category is uniquely identified by its nametag (e.g., "streetname") in addition to its namespace (e.g., "schemas-microsoft-com:outlook:contact")

Although the method 300 described above is one method for identifying semantic categories, there may be other mechanisms for identifying semantic categories. One mechanism is a grammar checker program module (not shown) connected to word processor program module 37. Another mechanism is receiving a semantic category from another electronic document. For example, when text containing a semantic category is copied from one electronic document and passed into another electronic document of the word processor program module 37, the information identifying the semantic category is preserved and copied along with the copied text.

Displaying Semantic Categories to the User

Figure 4:
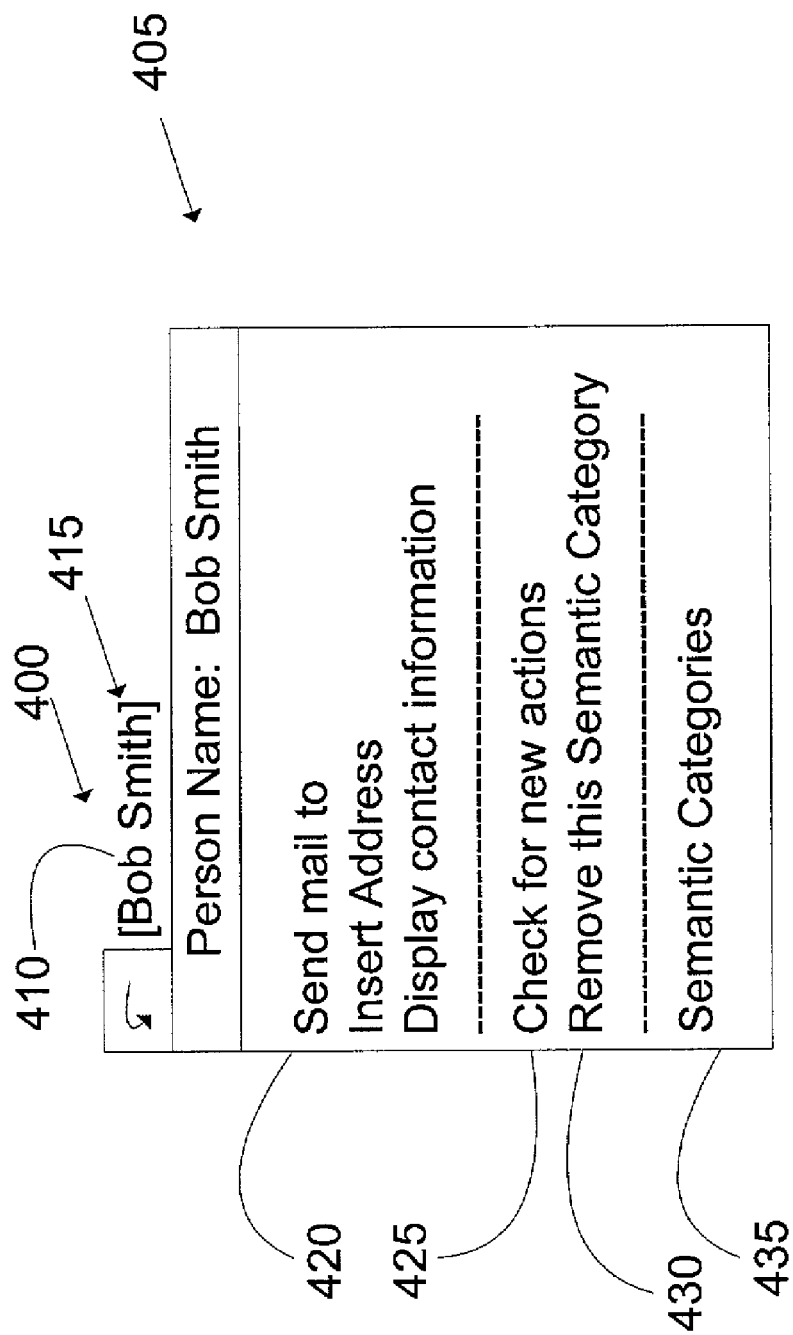
FIG. 4 is an illustration of a display of a semantic category and its associated dropdown menu.

Referring now to FIG. 4, an illustration of a display of a semantic category 400 and its associated dropdown menu 405 will be described. It should be understood that FIG. 4 is an illustration of a semantic category 400 and dropdown menu 405 as displayed to a user by the application program module 36.

The string 410 associated with semantic category 400 is the string "Bob Smith". As shown in FIG. 4, the string 410 of a semantic category 400 may be identified to the user by brackets 415. Of course, many other devices such as coloring, underlining, icons, etc. may be used to indicate to the user that a particular string is a semantic category.

In a preferred embodiment, when the user hovers a cursor over the string 410 or places the insertion point within string 410, then dropdown menu 405 is displayed to the user. The dropdown menu may display a list of actions associated with a semantic category. The dropdown menu may appear above and to the left of the semantic category string.

Typically, the first line of the dropdown menu indicates which string is the semantic category string (Bob Smith in FIG. 4) and what type the semantic category is (Person name in FIG. 4). Listed below the first line are actions 420 available for the semantic category type, such as "Send mail to . . . ", "Insert Address", and "Display contact information . . . ".

The first item on the drop down menu below the separator line is "Check for new actions . . . " 425. "Check for new actions. . . " 425 will appear only for semantic categories whose download URL is available to the application program module. If selected, "Check for new actions . . . " 425 uses the semantic category download URL to navigate the user's web browser to the homepage for the semantic category type applied to the string. For example, suppose new actions have been defined for the semantic category type "person name". If so, then new actions will be downloaded to the user's computer after selecting "Check for new actions . . . " 425. "Check for new actions . . . " 425 will be grayed out if a download URL is unavailable for the semantic category.

If selected, the "Remove this semantic category" item 430 deletes the semantic category label from the string. If selected, the "Semantic categories" item 435 navigates the user to the semantic categories tab of the autocorrect dialog.

It should be understood that the application program module sends a request to the action DLL to determine which actions are shown with each semantic category type.

Actions Performed in Association with Semantic Categories

There are a number of functions that users perform on typed data that preferred word processor program module 37 and semantic categories will make easier. The functions fall into three primary categories:

1) interacting with personal information manager contacts, tasks, meetings, and mail;
2) interacting with properties on the World Wide Web or a corporate intranet; and
3) interacting with other applications on the client machine.

A single string may be associated with multiple semantic categories. Every semantic category has a type label with one or more action plug-ins defined for the type label. For example, the "Address" type label may have the "Open in Mappoint", "Find with Expedia Maps" and "Add to my Address Book" actions associated with it and each of these actions may have a different action plug-in to execute the action.

The actions assigned to type labels also depend on the computer that the application program module is running on. Thus, if a computer has three actions registered for the type label "Address", then all strings with an "Address" type label will be assigned to three actions. However, if one of these semantic categories is sent to a computer which has only two actions registered for the "Address" type label, then the user will only be exposed to two actions for this semantic category.

Nesting of Semantic Categories

In an embodiment of the present invention, semantic categories may be nested inside each other. For example, the string "George Washington" may include a semantic category with type label "Person Name" for the span "George Washington State" and a semantic category with type label "State" for the span "Washington". Moreover, two semantic categories may cover exactly the same span. For example, the string "George Washington" may include a semantic category with type label "Person Name" and a semantic category with type label "President".

Because the preferred application program module 37 will support labeling a single string with multiple type labels (e.g. Bob Smith could be a semantic category labeled as a "Person Name" and labeled as a "Microsoft employee"), the preferred application program module 37 will use cascade menus on the dropdown menu if multiple semantic category types are assigned.

For example, the cascade menu may include a list of the type labels included in the recognized string. This list may include a type label "Person Name" and a type label "Microsoft employee".

It should be understood that a cascade menu may be used to allow the user to select which type label the user is interested in and to further select an action after selecting the type label.

In-document User Interface to Indicate Semantic Categories

As described above with reference to FIG. 4, the application program module may include the option to display an in-document user interface to indicate the location of semantic categories. This in-document user interface may use a colored indication to indicate the location of a semantic category, such as the brackets 415 in FIG. 4. The in-document user interface will also be able to show nesting of semantic categories. For example, if Michael Jordan is labeled as a semantic category with type label "Person Name", Michael is a semantic category with type label "First Name" and Jordan is a semantic category with type label "Last Name", the document may look like this with the brackets indicating semantic categories:

[[Michael][Jordan]]

Of course, the in-document user interface may be any sort of indication. For example, in the "EXCEL" spreadsheet application program, the interface comprises a triangle in the lower right hand portion of a cell to indicate that one or more semantic categories are present in the cell.

Although the present invention has been described as implemented in a word processing program module, it should be understood that the present invention may be implemented in other program modules, including, but not limited to, HTML authoring programs and programs such as the "POWERPOINT"® presentation graphics program and the "OFFICE" program module, both marketed by Microsoft Corporation of Redmond, Wash.

As described above, the semantic category may also include metadata returned by the recognizer plug-ins. For example, a recognizer plug-in that recognizes the titles of books may return as metadata an ISBN book number when it recognizes the title of a book. The ISBN book number metadata may then be used to provide actions. Metadata may also be used to disambiguate for actions and searches. For example, suppose a recognizer DLL is linked to a corporate employee database to recognize names. When the recognizer DLL recognizes "Bob Smith", it may store "employeeID=12345" as metadata in the background. Then, when an action is fired, the text in question will be known to reference Bob Smith, employee no. 12345 rather than Bob Smith, employee no. 45678. Also, the metadata may allow searches to be performed independent of the actual text in a document. So, a search may be conducted on "Robert Smith" by looking for employee 12345 in the employee databases and by performing a search on the metadata for employee number 12345 to find documents with "Bob Smith" in them. There are also numerous other functions for metadata. For instance, DHTML could be inserted so special features of a web browser, such as text color or font size, may be used. Additionally, data used by other actions may be inserted such as someone's e-mail address that could be used by the sendmail-to action, a normalized version of the date could be stored to easily interact with a personal information manager, etc.

Implementation of Exemplary Application Program Interfaces

Figure 5:
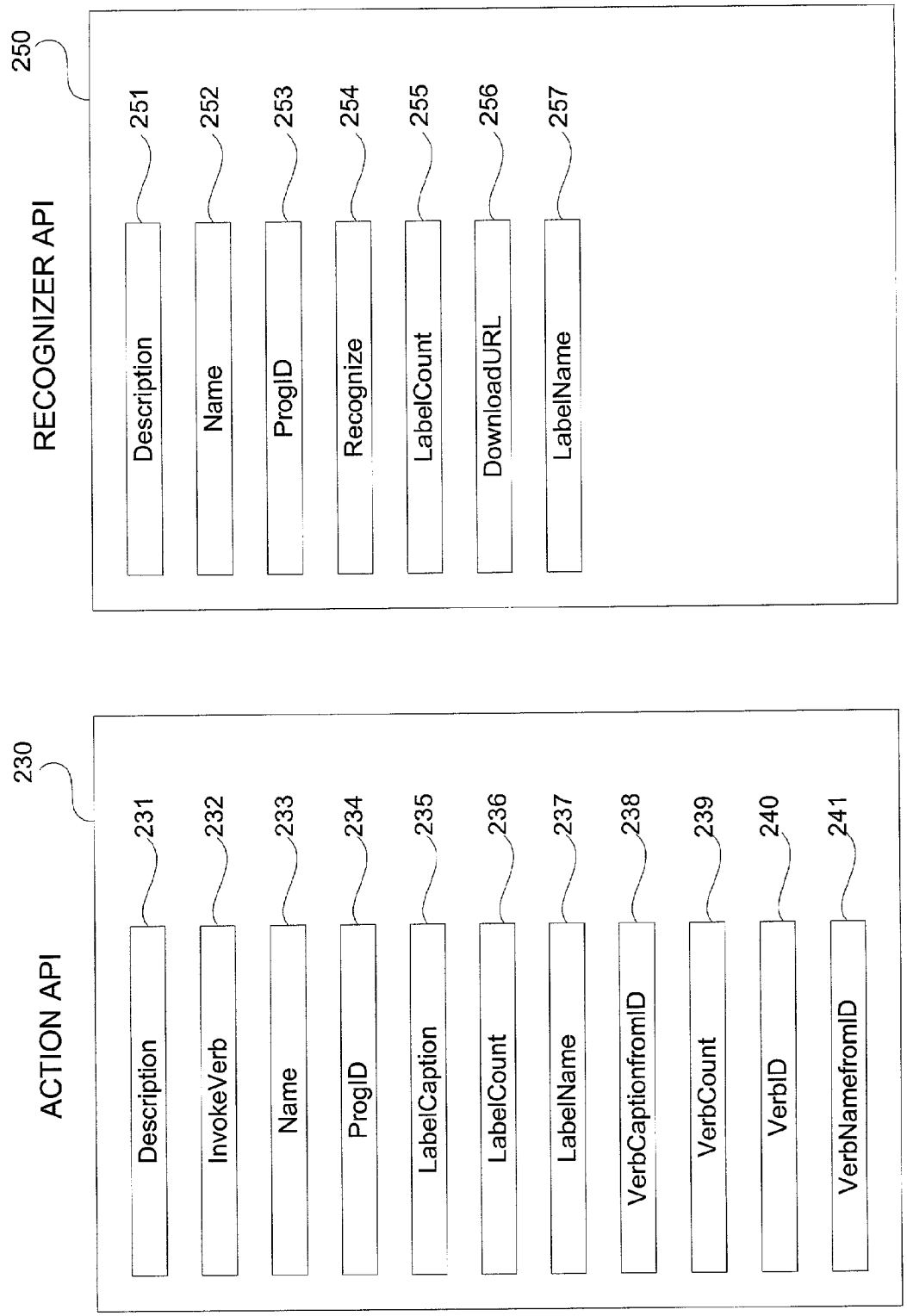
FIG. 5 is a block diagram illustrating properties and methods associated with an action API and a recognizer API.

According to an exemplary embodiment, application program interfaces (API) are provided for implementing the recognizer plug-ins 220 and the action plug-ins 225, discussed above. Referring to FIGS. 2 and 5, the recognizer API 250 includes a group of properties and methods or instructions that allow the recognizer plug-ins 220 to semantically label strings of text or cells of information, as discussed with reference to FIGS. 2 and 3. The action API 250 includes properties and methods or instructions that are called upon when a user initiates a particular action, for example, opening a Web browser, going to a particular URL, or opening an instance of a word processing application, a spreadsheet application, and the like.

Referring to FIG. 5, the properties and methods of the recognizer API 250 are illustrated. The Description property 251 includes a description of the recognizer plug-ins 220. The Name property 252 includes a name for the recognizer plug-in as it appears in a user interface such as a tools menu or options contained in a dialog box of an exemplary application program. The Prog(programmatic)ID 253 includes a unique identifier for the object class of the recognizer DLL. The Recognize method 254 includes instructions and routines for recognizing character strings as actionable after having been semantically labeled, as described above. The LabelCount property 236 describes the number of semantic label types the associated recognizer DLL recognizes, for example, book titles, movie titles, etc. The DownloadURL property 256 is the URL that is navigated to download additional semantic label types or categories. The LabelName property 257 includes unique identifiers for the semantic label types that the recognizer DLL supports.

The Description property 231 of the action API 230 includes a description of the semantic label action associated with a given action, for example, opening a Web browser. The InvokeVerb method 232 includes the routines and instructions that are executed when an action item is initiated, as described above. The Name property 233 includes a title for the given action. The ProgID property 234 includes a unique identifier of the object class for the particular action. The LabelCaption property 235 includes the caption that will be displayed at the top of a user interface such as an actions menu. The LabelCount property 236 includes the number of semantic label types recognized by a corresponding recognizer DLL or corresponding recognizer plug-ins. The LabelName property 237 identifies the types of semantic label actions, for example, opening a Web browser, navigating to a particular URL, opening an instance of an application program, etc.

The VerbCaptionFromID property 238 includes the captions for available actions provided in a user interface, such as an actions menu. The VerbCount property 239 includes how many actions are supported for a given semantic label type. The VerbID property 240 returns a unique identifier within the semantic label for use within a given application program. This mechanism is supplied so that the semantic label recognizer DLL and recognizer plug-ins can mix and match semantic label actions for various semantic label types supported by the DLLs and plug-ins. The VerbNameFromID property 241 returns a name to represent the semantic label action for use internally within a given application program. For example, for the semantic label action string "view company Website", the VerbNameFromID property 241 may return a name such as "viewCompanyWebsite".

The following is a discussion of an exemplary implementation of the recognizer API 250 and the action API 230. Following a discussion of various components of these APIs is exemplary code written in Microsoft Visual Basic 6.0 for a recognizer DLL and action DLL for locating a "Fourth Coffee" flavor in a set of coffee flavors. The code and the example are exemplary only and are not limiting of the scope of the invention described herein.

Implementing the Recognizer API

To implement the recognizer API 250, the ProgID property 253, the Name property 252, and the Description property 251 are populated by specifying the name and by providing a description of the particular recognizer DLL. Additionally, a locale identifier is passed to the recognizer DLL, for example, Spanish, German, English, etc., to give identification of the user interface language in which semantic labeling will occur for the particular recognizer DLL. The following is exemplary code written in Microsoft Visual Basic 6.0 for populating the ProgID property 253, the Name property 252, and the Description property 251.

```
        Private Property Get LabelRecognizer_ProgId( )
                As String
            LabelRecognizer_ProgId =
                "CoffeeFlavor.LabelRecognizer"
        End Property
        Private Property Get LabelRecognizer_Name
                (ByVal LocaleID As Long) As String
            LabelRecognizer_Name =
                "Coffee Flavors"
        End Property
        Private Property Get LabelRecognizer_Desc
                (ByVal LocaleID As Long) As String
            LabelRecognizer_Desc =
                "Directs users Coffee Flavors"
        End Property
```

Next, the number of semantic label types, the list of semantic label action types, and the additional semantic labels download location of the recognizer DLL are provided by populating the LabelCount property 255, the LabelName property 257 and the DownloadURL property 256. The number of semantic label types supported by the recognizer DLL 210 are populated. For example, if a value of two (2) for the LabelCount property is returned, there will be two subsequent calls made to the LabelName property with a label ID value of one (1) passed in the first call and a value of two passed in the second call. The download location includes the HTTP address used (download URL) to download tools associated with particular semantic labels. If no download URL is available, the value of the property is set to null. The following is exemplary code for populating the LabelCount property 255, the LabelName property 257 and the DownloadURL property 256.

```
        Private Property Get LabelRecognizer_LabelCount( )
                As Long
            LabelRecognizer_LabelCount = 1
        End Property
        Private Property Get LabelRecognizer_LabelName
                (ByVal LabelID As Long) As String
            If LabelID = 1 Then
                LabelRecognizer LabelName =
                    "schemas-fourth-com/fourthcoffee#flavor"
            End If
        End Property
        Private Property Get LabelRecognizer_DownloadURL
                (ByVal LabelID As Long) As String
            LabelRecognizer_DownloadURL = Null
        End Property
```

A list of items such as text in a word processing application or information contained in a cell of a spreadsheet is provided to the Recognize method 254. The text or information is provided to the recognizer plug-ins 220 of the recognizer DLL as a text string and the form of the text, for example, paragraph, cell, etc., is provided. The following is exemplary programming code for building a list of strings associated with, for example, coffee flavors to be recognized by the recognizer plug-ins 220 of the recognizer DLL 210. According to an exemplary embodiment, to avoid rebuilding the list of strings every time there is a call to recognize a text item, the list is built and populated in an array when the class of semantic label types is created.

```
        Dim garrTerms(6) As String
        Dim gintNumTerms As Integer
        Private Sub Class_Initialize( )
            garrTerms(1) = "latte"
            garrTerms(2) = "carmelito"
            garrTerms(3) = "verona"
            garrTerms(4) = "Columbia blend"
            garrTerms(5) = "antigua"
            garrTerms(6) "kona"
            gintNumTerms = 6
        End Sub
```

After the list of strings to be recognized is built, as described above, the Recognize method 254 is constructed that will search for strings in the array created above. The search performs a case-insensitive search through the passed-in strings of text for each of the terms supplied. For the example given above, the strings supplied include a variety of coffee flavors. Construction of the Recognize method 254 includes passing in the language identifier of the text strings to be searched by the recognizer DLL, for example, German, English, etc. Additionally, an object is passed in to add additional semantic labels. A Property Bag property allows for the addition of new attributes/value pairs to be added to semantic labels. For example, the name "Bob Smith" may be set up as a name type, but the Property Bag property allows for the storage of other values like employee ID, telephone number, address by adding new attribute/value pairs to the semantic label type. For example, the attribute "employee ID" and the value "123" may be added to the name type for "Bob Smith." Information is also passed in to define the name space in the document, and to specify the start position of the string and the length of the string. The following is exemplary programming code for constructing the Recognize method 254.

```
        Private Sub LabelRecognizer_Recognizer_Recognize
            (ByVal Text As String,
            ByVal DataType As LabelLib.IF_TYPE,
            ByVal LocaleID As Long,
            ByVal RecognizerSite As
                LabelLib.LabelRecognizerSite)
        Dim intLoop As Integer
        Dim intIndex As Integer
        Dim intTermLen As Integer
        Dim stlPropertyBag As LabelLib.ILabelProperties
        Text = LCase(String:=Text)
        For intLoop = 1 To gintNumTerms
            intIndex = InStr(Text, garrTerms(intLoop))
            intTermLen = Len(garrTerms(intLoop))
            Do While intIndex > 0
                Set stlPropertyBag =
                    RecognizerSite.GetNewPropertyBag
                RecognizerSite.CommitLabel
                    "schemas-fourth-com/fourthcoffee#flavor", intIndex,
                    intTermLen, stlPropertyBag
                intIndex = InStr(intIndex + intTermLen,
                    Text, garrTerms(intLoop))
            Loop
        Next intLoop
        End Sub
```

Implementing the Action API

After construction of the Recognize method 254, the action API 230 is constructed by first populating the ProgID property 234, the Name property 233, and the Description property 231. Population of those properties is similar to population of similar properties for the recognizer API 250, described above. The following is exemplary programming code for populating the ProgID property 234, the Name property 233, and the Description property 231 of the action API 230.

```
Private Property Get LabelAction_ProgId( ) As String
    LabelAction_ProgId =
        "CoffeeFlavor.LabelAction"
End Property
Private Property Get LabelAction_Name
        (ByVal LocaleID As Long) As String
    LabelAction_Name = "Coffee Flavor actions"
End Property
Private Property Get LabelAction_Desc
        (ByVal LocaleID As Long) As String
    LabelAction_Desc =
        "Provides actions for certain Coffee Flavors"
End Property
```

The recognizer DLL 210 is informed of the number, names, and captions of the semantic label types by populating the LabelCount property 236, the LabelName property 237, and the LabelCaption property 235. For each label type supported by the recognizer plug-ins 220 of the recognizer DLL 210, the recognizer DLL 210 is informed of the number of actions. If there are three actions for the label type "persons" and two actions for the label type "companies," then a total of five label types are passed to the recognizer DLL. A name for each action class is provided and a caption that will appear in an appropriate user interface such as an action menu is provided. For example, the caption "Coffee flavors at Joe's Coffee House" might be provided for an action that will navigate to the Web page of Joe's Coffee House for a semantically labeled coffee flavor. In addition, according to an exemplary embodiment, the application programs applicable to a given action may be identified so that inapplicable application programs may be disabled. For example, if the semantically labeled information is not applicable for use in a spreadsheet, a spreadsheet application may be disabled. The following is exemplary programming code for populating the Label-Count, the LabelName and LabelCaption properties.

```
Private Property Get LabelAction_LabelCount( )
        As Long
    LabelAction_LabelCount = 1
End Property
Private Property Get LabelAction_LabelName
        (ByVal LabelID As Long) As String
    If LabelID = 1 Then
        LabelAction_LabelName =
            "schemas-fourth-com/fourthcoffee#flavor"
    End If
End Property
Private Property Get LabelAction_LabelCaption
        (ByVal LabelID As Long,
        ByVal LocaleID As Long)
        As String
    LabelAction_LabelCaption =
        "Selected Coffee Flavors"
End Property
```

Next, the recognizer DLL is informed of the number, names, and identifiers of supported semantic label actions by populating the VerbCount property 239, the VerbID property 240, the VerbCaptionFromID property 238, and the VerbNameFromID property 241. Population of these properties is done on a label type by label type basis to tell the label actions about verbs that are supported. Generating a unique ID for a particular verb is performed by the action DLL 215 which gives the action DLL more flexibility. For example, a semantic label action DLL can specify the same VerbID value for the same action across varying semantic label types, or the DLL can use the same VerbID for similar variants of an action. The following is exemplary programming code for populating the VerbCount, VerbID, VerbCaptionFromID, and VerbNameFromID properties.

```
Private Property Get LabelAction_VerbCount
        (ByVal LabelName As String) As Long
    If LabelName = "schemas-fourth-com/fourthcoffee#flavor" Then
        LabelAction_VerbCount = 6
    End If
End Property
Private Property Get LabelAction_VerbID
        (ByVal LabelName As String,
        ByVal VerbIndex As Long)
        As Long
    LabelAction_VerbID = VerbIndex
End Property
Private Property Get LabelAction_VerbCaptionFromID
        (ByVal VerbID As Long,
        ByVal ApplicationName As String,
        ByVal LocaleID As Long)
        As String
    Select Case VerbID
        Case 1
            LabelAction_VerbCaptionFromID =
                "latte"
        Case 2
            LabelAction_VerbCaptionFromID =
                "carmelito"
        Case 3
            LabelAction_VerbCaptionFromID =
                "verona"
        Case 4
            LabelAction_VerbCaptionFromID =
                "Columbia blend"
        Case 5
            LabelAction_VerbCaptionFromID =
                "antigua"
        Case 6
            LabelAction_VerbCaptionFromID =
                "kona"
    End Select
End Property
Private Property Get LabelAction_VerbNameFromID
        (ByVal VerbID As Long) As String
    Select Case VerbID
        Case 1
            LabelAction_VerbNameFromID = "latte"
        Case 2
            LabelAction_VerbNameFromID = "carmelito"
        Case 3
            LabelAction_VerbNameFromID = "verona"
        Case 4
            LabelAction_VerbNameFromID = "Columbia blend"
        Case 5
            LabelAction_VerbNameFromID = "antigua"
        Case 6
            LabelAction_VerbNameFromID = "kona"
    End Select
End Property
```

After those properties are populated, the InvokeVerb method 232 is constructed for invoking the appropriate verb when the user selects an action displayed in the semantic label user interface corresponding to the VerbCaptionFromID value. According to the exemplary programming code provided below, six actions are provided which are hyperlinks that navigate to six coffee flavor Web sites. Construction of the InvokeVerb method includes identifying the verb, identifying the action, and naming the application program 36 so that different actions may be performed depending on the context, for example, word processing text versus cell data in a spreadsheet.

According to an exemplary embodiment, a pointer may be given to an application program's 36 object model so that the action DLL may use the object model to manipulate text in a document, insert text, manipulate data in a spreadsheet, etc. The label text, the label type, and contents of a property bag are provided, and that information may be provided according to alternate computing languages, for example XML, so that the information may be manipulated using alternate language systems, such as XML parsers. This aspect is useful for manipulating multiple nested semantic labels, for example, street, city, state, and zip code. The following is exemplary programming code for constructing the InvokeVerb method 232 of the action API 230.

```
Private Sub LabelAction_InvokeVerb
    (ByVal VerbID As Long,
    ByVal ApplicationName As String,
    ByVal Target As Object,
    ByVal Properties As LabelLib.ILabelProperties,
    ByVal Text As String,
    ByVal Xml As String)
Dim ieInternetExplorer As Variant
Set ieInternetExplorer =
    CreateObject("InternetExplorer.Application")
With ieInternetExplorer
    Select Case VerbID
        Case 1
            .Navigate2 "www.latte.com"
        Case 2
            .Navigate2 "www.carmelito.com"
        Case 3
            .Navigate2 "www.verona.com"
        Case 4
            .Navigate2 "www.columbiablend.com"
        Case 5
            .Navigate2 "www.antigua.com"
        Case 6
            .Navigate2 "www.kona.com"
    End Select
    .Visible = True
End With
End Sub
```

Registration of Application Programming Interfaces

In order for the application program module, such as a word processing application or a spreadsheet application, to know that the recognizer and action plug-ins and DLLs constructed and made operable by the construction of the APIs, discussed above, are actually plug-ins and DLLs for use by the application, the plug-ins and DLLs must be registered in the operating system registry of the user's computer 20. Accordingly, information is written into the registry of the operating system 35 so that any plug-ins and DLLs referred to by the semantic label properties in that portion of the system registry will be booted by the applicable application program utilizing the semantic labeling functionality when that application programs boots.

Although the present invention has been described above as implemented in a preferred application program module, it will be understood that alternative embodiments will become apparent to those skilled in the art to which the present invention pertains without departing from its spirit and scope. Accordingly, the scope of the present invention is defined by the appended claims rather than the foregoing description.

What is claimed is:

1. In a system for semantically labeling a string of text in an electronic document created in an application program module, a method of implementing an application program interface for further implementing a recognizer plug-in, the method comprising:
   providing, for the recognizer plug-in, an identification, a title, and a description, wherein the recognizer plug-in is provided for recognizing text items as belonging to one of a plurality of semantic categories;
   providing a number of text label types and a download location for additional label types, wherein each text label type belongs to a semantic category;
   providing a list of text items for recognition as belonging to the semantic category by the recognizer plug-in;
   receiving a selection of text in the recognizer plug-in; and
   causing the recognizer plug-in to search for the text items belonging to the semantic category from the list of text items in the selection of text received by the recognizer plug-in;
   labeling the recognized text items with at least one text label belonging to the semantic category, wherein the semantic category is associated with a plurality of possible actions to be performed by the system based upon the semantic category and the text label associated with the electronic document; and
   storing the at least one text label and the plurality of semantic categories to which the recognized text items belong in the electronic document as part of a semantic category namespace.

2. The method of claim 1, further comprising registering the recognizer plug-in in an operating system registry.

3. The method of claim 1, wherein providing the identification, the title, and the description for the recognizer plug-in includes providing the name of the recognizer plug-in for presentation via a user interface.

4. The method of claim 1, wherein providing the number of text label types includes providing a number of text label types recognizable by the recognizer plug-in.

5. The method of claim 1 wherein providing the download location for additional text label types includes providing a uniform resource locator (URL) for obtaining additional text label types.

6. In a system for semantically labeling a string of text in an electronic document created in an application program module, a method of implementing an application program interface for further implementing an action plug-in, the method comprising:
   providing, for the action plug-in, an identification, a title, and a description, wherein the action plug-in provides a plurality of possible actions to be performed by the system based upon a semantic category represented by the semantically labeled string of text and at least one text label associated with the string of text, and wherein the semantically labeled text is labeled as a result of a recognition process of a received selection of text and the at least one text label is stored in the electronic document;
   providing to a recognizer DLL a number of text label types, a name for each of the number of text label types, and a caption for each of the number of text label types, wherein the caption identifies each of the number of text label types as belonging to a semantic category, wherein the semantic category is associated with the electronic document by storing the semantic category in the electronic document as part of a semantic category namespace;

providing the recognizer DLL a number of text label actions, a name for each of the number of text label actions, and an identification for each of the number of text label actions, wherein each text label action is associated with the text label related to the string of text; and displaying a list of the text label actions upon user initiation.

7. The method of claim 6, further comprising prior to displaying The list of the text label actions upon user initiation, providing names of each of the number of text label actions for presentation in a user interface.

8. The method of claim 7, wherein providing to the recognizer DLL a caption for each of the number of text label types, further comprises providing captions for displaying in the user interface each of the number of text label types.

9. The method of claim 6, wherein providing to the recognizer DLL the number of text label types, includes providing a number of text label types for which the action plug-in provides actions.

10. The method of claim 6 further comprising registering the recognizer DLL and the action plug-in in a computer operating system registry.

11. The method of claim 6, wherein the semantic category is and extensible markup language (XML) construct for uniquely identifying a group of XML tags that belong to each of the number of text label types.

12. In a system for semantically labeling a string of text in an electronic document created in an application program module, a method of implementing an application program interface for further implementing a recognizer plug-in and an action plug-in, the method comprising:

providing, for the recognizer plug-in, an identification, a title, and a description, wherein the recognizer plug-in is provided for recognizing text items as belonging to one of a plurality of semantic categories;

providing the recognizer plug-in a number of text label types, a name for each of the number of text label types, and a caption for each of the number of text label types wherein the caption identifies each of the number of text label types, wherein each text label type belongs to a semantic category;

providing the recognizer plug-in a list of text items for recognition by the recognizer plug-in as belonging to the semantic category;

providing the recognizer plug-in a number of text label actions, a name for each of the number of text label actions, an identification for each of the number of text label actions, and a download location for additional label types;

causing the recognizer plug-in to search for text items belonging to the semantic category from the list of text items in a selection of text received by the recognizer plug-in and to label semantically the string of text with at least one text label belonging to the semantic category, wherein the semantic category is associated with a plurality of possible actions to be performed by the system based upon the semantic category and the text label associated with the electronic document;

storing the at least one text label and the plurality of semantic categories to which the recognized text items belong in the electronic document as part of a semantic category namespace;

providing an identification, a title, and a description for the action plug-in wherein the action plug-in provides possible actions to be performed by the system based upon the semantically labeled string of text; and displaying a list of the text label actions upon user initiation.

13. The method of claim 12, further comprising registering the recognizer plug-in and the action plug-in in an operating system registry.

14. The method of claim 12, wherein providing the identification, the title, and the description for the recognizer plug-in includes providing the name of the recognizer plug-in for presentation via a user interface.

15. The method of claim 12, wherein providing the number of text label types includes providing a number of text label types recognizable by the recognizer plug-in.

16. The method of claim 12, wherein providing the list of text label action types includes providing a list of text label action types associated with the action plug-in and recognizable by the recognizer plug-in.

17. The method of claim 12, wherein providing the download location for additional text label types includes providing a uniform resource locator (URL) for obtaining additional text label types.

18. A system for semantically labeling a string of text in an electronic document created in an application program module, the system embodied on a computer-readable media and including a recognizer plug-in and an application program interface (API) for allowing the recognizer plug-in to semantically label strings of text, comprising:

a Description property including a description of the recognizer plug-in;

a Name property including a name of the recognizer plug-in;

a programmatic identifier including a unique identifier for the recognizer plug-in;

a LabelCount property identifying a number of semantic label types recognizable by the recognizer plug-in;

a LabelName property including unique identifiers for the semantic label types recognizable by the recognizer plug-in;

a label DownloadURL property for locating additional semantic label types recognizable by the recognizer plug-in;

a Recognize method including instructions which when executed by a computer cause the recognizer plug-in to recognize character strings semantically labeled with at least one text label as character string types recognizable by the recognizer plug-in as belonging to a semantic category, wherein the semantic category is associated with a plurality of possible actions to be performed by the system based upon the semantic category and the text label associated with the electronic document; and a storage method including instructions which when executed by a computer cause the computer to store the at least one text label and the semantic category to which the recognized character strings belong in the electronic document as part of a semantic category namespace.

19. The system of claim 18, further comprising an action API, comprising a Description property describing a semantic label action associated with an action operable on the semantically labeled text string;

a Name property including a title for the semantic label action, wherein the semantic label action identifies an action to be performed by the system based on the text label of the semantically labeled text string;

a programmatic identifier property including a unique identifier for the semantic label action;

a LabelCaption property for displaying via a user interface an identification of a text label type for the semantically labeled text string;

a LabelName property identifying a number of types of semantic label actions operable by the action plug-in;

a LabelCount property identifying the number of semantic label types recognizable by the recognizer plug-in;

a VerbOaptionFromlD property including captions for the number of semantic label actions provided via a user interface, wherein the captions identify an action class for the number of semantic label actions;

a VerbCount property including a quantity of semantic label actions supported by a semantic label type;

a VerbID property for returning a unique identifier within a semantic label for use within the application program module;

a VerbNameFromlD property for returning a name to represent a semantic label action for use within the application program module; and an InvokeVerb method including instructions which when executed by a computer initiate the semantic label action.

* * * * *